US012675236B2

(12) United States Patent
Jung et al.

(10) Patent No.: US 12,675,236 B2
(45) Date of Patent: Jul. 7, 2026

(54) STORAGE SYSTEM SUPPORTING MULTIPLE QUEUES

(71) Applicant: SAMSUNG ELECTRONICS CO., LTD., Suwon-si (KR)

(72) Inventors: Daejin Jung, Suwon-si (KR); Jeong-Woo Park, Suwon-si (KR); Yonghwan Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/397,765

(22) Filed: Dec. 27, 2023

(65) Prior Publication Data

US 2024/0272827 A1 Aug. 15, 2024

(30) Foreign Application Priority Data

Feb. 9, 2023 (KR) ........................ 10-2023-0017630

(51) Int. Cl.
*G06F 3/06* (2006.01)
(52) U.S. Cl.
CPC .......... *G06F 3/0659* (2013.01); *G06F 3/0604* (2013.01); *G06F 3/0658* (2013.01); *G06F 3/0679* (2013.01)
(58) Field of Classification Search
CPC .... G06F 3/0658; G06F 3/0659; G06F 3/0604; G06F 3/0688; G06F 3/0679; G06F 3/061
See application file for complete search history.

(56) References Cited

U.S. PATENT DOCUMENTS

| | | | |
|---|---|---|---|
| 8,874,836 B1 | 10/2014 | Hayes et al. | |
| 9,058,208 B2 | 6/2015 | Chang et al. | |
| 9,760,281 B2 | 9/2017 | Ramalingam | |
| 10,628,216 B2 | 4/2020 | Miao et al. | |
| 11,003,360 B2 | 5/2021 | Yu et al. | |
| 11,044,313 B2 | 6/2021 | Patel et al. | |
| 2013/0268721 A1 | 10/2013 | Koh et al. | |
| 2013/0326141 A1* | 12/2013 | Marcu ................... | G06F 3/0679 |
| | | | 711/159 |

(Continued)

FOREIGN PATENT DOCUMENTS

KR 10-2013-0114486 A 10/2013

OTHER PUBLICATIONS

Communication dated Jun. 20, 2024, issued by the European Patent Office in counterpart European Application No. 24153806.5.

(Continued)

*Primary Examiner* — Mark A Giardino, Jr.
(74) *Attorney, Agent, or Firm* — Sughrue Mion, PLLC

(57) ABSTRACT

A storage system includes a host device supporting multiple queues and a storage device communicating with the host device. The host device may include first and second cores, first and second queues corresponding to the first and second cores and storing commands, and a host controller that sets a queue ID and/or a parallelism demand level for each commands stored in the first and second queues. The storage device may include nonvolatile memories and a storage controller that detects pattern information of commands, received from the host device, based on the queue ID and places the commands, received from the host device, in the nonvolatile memories based on the pattern information.

20 Claims, 21 Drawing Sheets

(56) References Cited

U.S. PATENT DOCUMENTS

| | | | |
|---|---|---|---|
| 2015/0134857 A1* | 5/2015 | Hahn | G06F 3/061 |
| | | | 710/5 |
| 2019/0012099 A1* | 1/2019 | Mulani | G06F 3/0619 |
| 2019/0332426 A1* | 10/2019 | Zhang | G06F 12/0806 |
| 2020/0301609 A1* | 9/2020 | Haga | G06F 3/0638 |
| 2021/0374079 A1* | 12/2021 | Shin | G06F 13/382 |
| 2024/0086107 A1* | 3/2024 | Nayak | G06F 3/0679 |
| 2024/0303111 A1* | 9/2024 | Ahn | G06F 9/4881 |

OTHER PUBLICATIONS

Anonymous, "Universal Flash Storage (UFS), Version 3.1," JEDEC, JEDEC Solid State Technology Association, JEDEC Standard, vol. JESD220E, Jan. 2020, total 421 pages.

* cited by examiner

FIG. 4

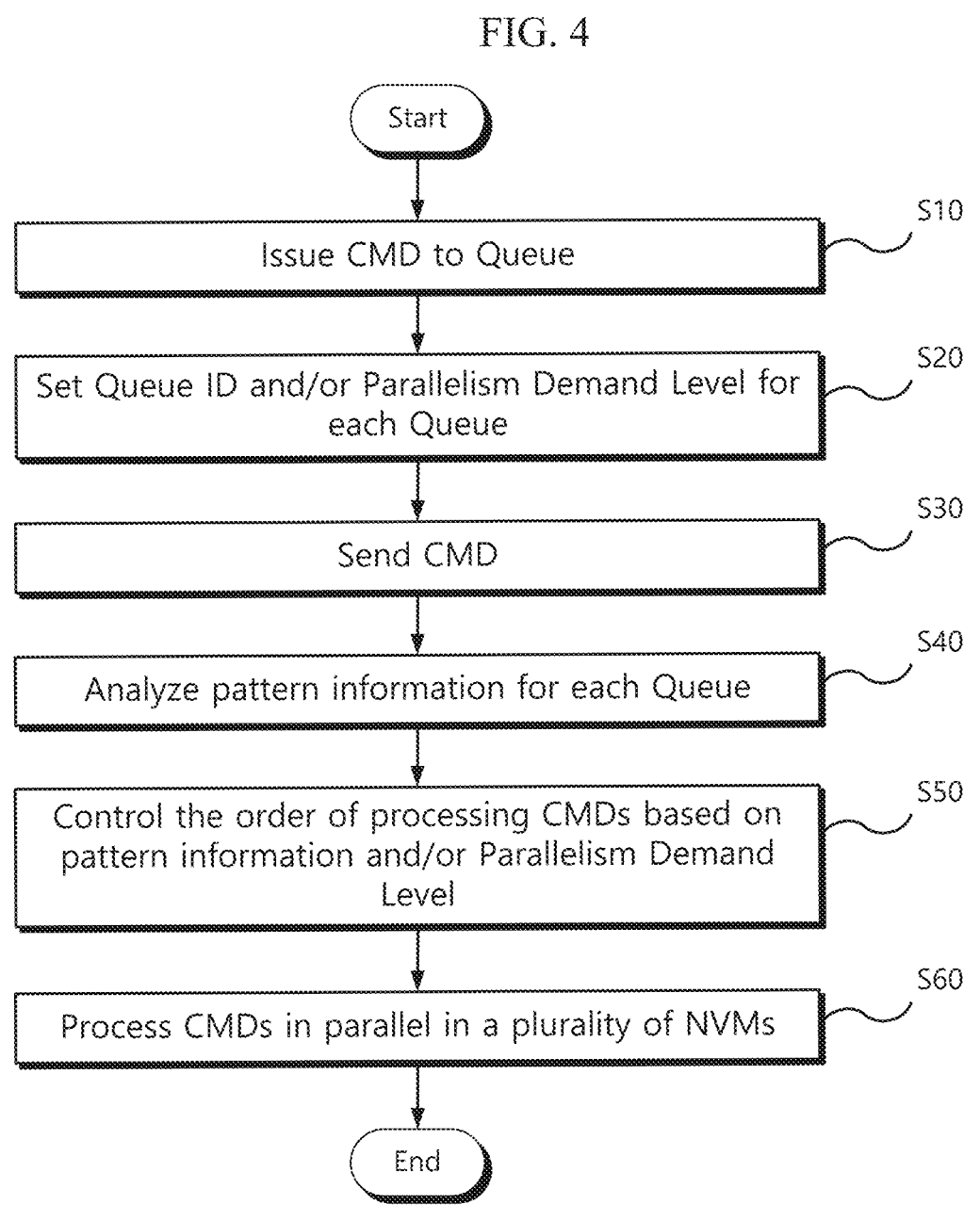

Start

Issue CMD to Queue    S10

Set Queue ID and/or Parallelism Demand Level for each Queue    S20

Send CMD    S30

Analyze pattern information for each Queue    S40

Control the order of processing CMDs based on pattern information and/or Parallelism Demand Level    S50

Process CMDs in parallel in a plurality of NVMs    S60

End

FIG. 6

| CMD | Queue ID | Parallelism Demand Level |
|---|---|---|
| CMD0~CMD7 | Q1 | High |
| CMD0~CMD7 | Q2 | Normal |
| CMD0~CMD7 | Q3 | Normal |
| CMD0~CMD7 | Q4 | Normal |

FIG. 7A

| Bit / Byte | 7 | 6 | 5 | 4 | 3 | 2 | 1 | 0 |
|---|---|---|---|---|---|---|---|---|
| 0 | OPERATION CODE (2Ah) | | | | | | | |
| 1 | RDPROTECT =000b | | | DPO | FUA | Reserved | FUA_NV =0b | Obsolete |
| 2 | (MSB) | | | | | | | |
| 3 | | | | LOGICAL BLOCK ADDRESS | | | | |
| 4 | | | | | | | | |
| 5 | | | | | | | | (LSB) |
| 6 | Reserved | Parallelism Demand Level | | Group Number (Queue ID) | | | | |
| 7 | (MSB) | | | TRANSFER LENGTH | | | | |
| 8 | | | | | | | | (LSB) |
| 9 | CONTORL = 00h | | | | | | | |

FIG. 7B

| GROUP NUMBER Value | Function |
|---|---|
| 00000b | Default, no Context is associated with the read operation. |
| 00001b to 01111b (0XXXXXb) | Context ID. (XXXX from 0001b to 1111b -- Context ID value) |
| 10000b to 11111b (1XXXXXb) | Queue ID. (XXXX from 10000b to 11111b -- Queue ID value) |

FIG. 7C

| wContextConf ATTRIBUTES | |
|---|---|
| wContextConf Bit | Parallelism Demand Level |
| 00b | No Priority |
| 01b | Normal |
| 10b | High |
| 11b | Reserved |

FIG. 10

| CMD | Queue ID | Parallelism Demand Level |
|---|---|---|
| CMD0~CMD7 | Q1 | Normal |
| CMD0~CMD7 | Q2 | High |
| CMD0~CMD7 | Q3 | Normal |
| CMD0~CMD7 | Q4 | Normal |

FIG. 12

| Priority | Pattern | Parallelism Demand Level |
|----------|------------|--------------------------|
| 1 | Sequential | High |
| 2 | Sequential | Normal |
| 3 | Random | High |
| 4 | Random | Normal |

FIG. 14

| Bit / Byte | 7 | 6 | 5 | 4 | 3 | 2 | 1 | 0 |
|---|---|---|---|---|---|---|---|---|
| 0 | OPERATION CODE (2Ah) | | | | | | | |
| 1 | WRPROTECT =000b | | | DPO | FUA | Reserved | FUA_NV =0b | Obsolete |
| 2 | (MSB) | | | | | | | |
| 3 | | | | LOGICAL BLOCK ADDRESS | | | | |
| 4 | | | | | | | | |
| 5 | | | | | | | | (LSB) |
| 6 | Reserved | Parallelism Demand Level | | Group Number (Queue ID) | | | | |
| 7 | (MSB) | | | TRANSFER LENGTH | | | | |
| 8 | | | | | | | | (LSB) |
| 9 | CONTORL = 00h | | | | | | | |

FIG. 17

| Bit<br>Byte | 7 | 6 | 5 | 4 | 3 | 2 | 1 | 0 |
|---|---|---|---|---|---|---|---|---|
| 0 | OPERATION CODE (2Ah) | | | | | | | |
| 1 | RDPROTECT<br>=000b | | | DPO | FUA | Reserved | FUA_NV<br>=0b | Obsolete |
| 2 | (MSB) | | | | | | | |
| 3 | | | | LOGICAL BLOCK ADDRESS | | | | |
| 4 | | | | | | | | |
| 5 | | | | | | | | (LSB) |
| 6 | Reserved | Reserved | | Group Number (Queue ID) | | | | |
| 7 | (MSB) | | | TRANSFER LENGTH | | | | |
| 8 | | | | | | | | (LSB) |
| 9 | CONTORL = 00h | | | | | | | |

FIG. 18

| Bit Byte | 7 | 6 | 5 | 4 | 3 | 2 | 1 | 0 |
|---|---|---|---|---|---|---|---|---|
| 0 | OPERATION CODE (2Ah) | | | | | | | |
| 1 | WRPROTECT =000b | | | DPO | FUA | Reserved | FUA_NV =0b | Obsolete |
| 2 | (MSB) | | | | | | | |
| 3 | | | | LOGICAL BLOCK ADDRESS | | | | |
| 4 | | | | | | | | |
| 5 | | | | | | | | (LSB) |
| 6 | Reserved | Reserved | | Group Number (Queue ID) | | | | |
| 7 | (MSB) | | | TRANSFER LENGTH | | | | |
| 8 | | | | | | | | (LSB) |
| 9 | CONTORL = 00h | | | | | | | |

10C

100C

200C

HOST DEVICE

APPLICATION 410

OPERATING SYSTEM 420

CMD MANAGER 430

DATA TRANSFER MANAGER 440

PHY 450

STORAGE DEVICE

NVM MANAGER 510

IO SCHEDULER 520

PATTERN ANALYZER 530

DATA TRANSFER MANAGER 540

PHY 550

STORAGE SYSTEM SUPPORTING MULTIPLE QUEUES

CROSS-REFERENCE TO RELATED APPLICATION

This application claims priority to Korean Patent Application No. 10-2023-0017630, filed on Feb. 9, 2023, in the Korean Intellectual Property Office, the disclosure of which being incorporated by reference herein in its entirety.

BACKGROUND

The present disclosure relates to a storage system.

The number of host devices introducing multiple queues has been increasing in recent years. For example, in mobile devices, multiple queues have been introduced into a Linux block layer, a host controller interface, or the like, to improve input/output performance. However, a storage device connected to such a host device does not recognize multiple queues provided by the host device, so that a parallel processing function provided by the storage device is not properly utilized.

SUMMARY

It is an aspect to provide a storage system which may effectively use a parallel processing function of a storage device.

According to an aspect of one or more example embodiments, a storage system may include a host device supporting multiple queues, the host device comprising a first core; a first queue corresponding to the first core and configured to store a plurality of commands: a second core: a second queue corresponding to the second core and configured to store a plurality of commands; and a host controller configured to set a queue identifier (ID) for each the plurality of commands stored in the first queue and each of the plurality of commands stored in the second queue, and a storage device communicating with the host device, the storage device comprising a plurality of nonvolatile memories; and a storage controller configured to detect pattern information of received commands that are received from the host device, based on the queue ID and to place the received commands in the plurality of nonvolatile memories based on the pattern information.

According to another aspect of one or more example embodiments, a host device communicating with a storage device may include a host memory configured to store multiple queues; and a host controller configured to set a queue identifier (ID) and a parallelism demand level for commands, respectively corresponding to the multiple queues, wherein the host controller sets the queue ID in a group number field of each command and sets the parallelism demand level in a reserved area of each command.

According to yet another aspect of one or more example embodiments, a storage device communicating with a host device may include a pattern analyzer configured to sequentially receive a plurality of commands from the host device and to analyze pattern information of the plurality of commands by queue based on a queue identifier (ID) of each of the plurality of commands: an input/output scheduler configured to control an order of processing the plurality of commands based on the pattern information; and a plurality of nonvolatile memories configured to perform read or write operations in parallel based on the order of processing the plurality of commands determined by the input/output scheduler.

BRIEF DESCRIPTION OF DRAWINGS

The above and other aspects, features, and advantages of the present disclosure will be more clearly understood from the following detailed description, taken in conjunction with the accompanying drawings, in which:

FIG. 4 is a flowchart illustrating an operation of a storage system of FIG. 1, according to some example embodiments:

FIG. 6 is a diagram illustrating an example in which a queue ID and a parallelism demand level are set by the host device, according to some example embodiments:

FIG. 7A is a diagram illustrating an example of a table of a read command, according to some example embodiments:

FIG. 7B is a diagram illustrating an example of a bit value of a field setting a queue ID, according to some example embodiments:

FIG. 7C is a diagram illustrating an example of a bit value of a field in which a parallelism demand level is set, according to some example embodiments:

FIG. 10 is a diagram illustrating an example in which a queue ID and a parallelism demand level are set by the host device, according to some example embodiments:

FIG. 12 is a diagram illustrating an example of a method of setting a priority for a parallel processing function of the storage device, according to some example embodiments:

FIG. 14 is a diagram illustrating an example of a table of a write command, according to some example embodiments:

FIG. 17 is a diagram illustrating an example of a table of a read command, according to some example embodiments:

FIG. 18 is a diagram illustrating an example of a table of a write command, according to some example embodiments;

DETAILED DESCRIPTION

Hereinafter, various example embodiments will be described with reference to the accompanying drawings.

Figure 1:
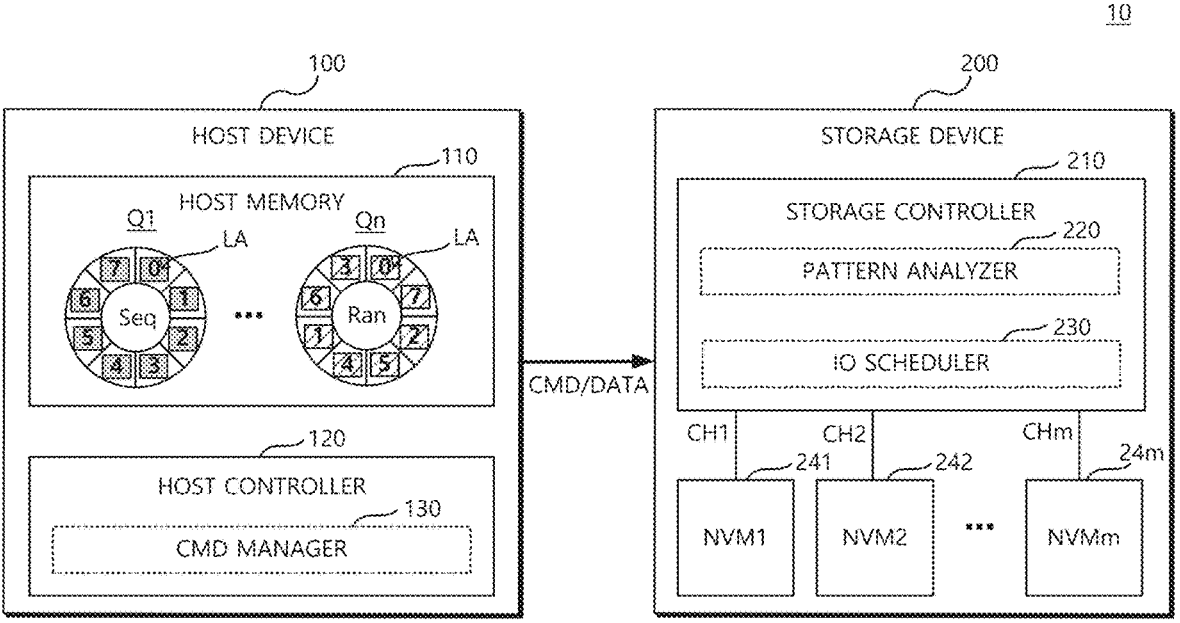
FIG. 1 is a diagram illustrating a storage system according to some example embodiments and an external test device for testing the memory device.

FIG. 1 is a block diagram of a storage system, according to some example embodiments.

A storage system 10 according to some example embodiments may include a host device 100 and a storage device 200. The host device 100 may support multiple queues, and the storage device 200 may support a parallel processing function. The parallel processing function of the storage device 200 may include, for example, a parallel read operation or a parallel write operation on a plurality of nonvolatile memories included in the storage device 200.

The host device 100 according to some example embodiments may set information on a queue identifier (ID) for each command CMD to effectively utilize the parallel processing function of the storage device 200. The queue ID may refer to identification information on a queue to which each command belongs. The storage device 200 may sort commands, received from the host device 100, by each queue based on the queue ID and may detect pattern information of each queue. The storage device 200 may control an order of processing commands such that the parallel processing function is effectively utilized based on the pattern information of each queue.

According to some example embodiments, the host device 100 may set a parallelism demand level for each queue. The parallelism demand level may refer to a priority level for the parallel processing function provided by the storage device 200. The storage device 200 may control an order of processing commands such that the parallel processing function is effectively utilized based on the pattern information of each queue and the parallelism demand level. As a result, the parallel processing function of the storage device 200 may be effectively utilized in an environment in which the host device 100 supports the multiple queues.

A detailed description will be provided with reference to FIG. 1. The host device 100 may include a host memory 110 and a host controller 120. In some example embodiments, the host controller 120 may include a command manager 130.

The host memory 110 may be used as a main memory or a cache memory. In some example embodiments, the host memory 110 may be used as a driving memory for driving software, application programs, firmware, or the like. Programs or pieces of data to be processed by the host controller 120 may be loaded into the host memory 110. For example, a file system, application programs, a device driver, or the like, may be loaded into the host memory 110. For example, the host device 200 may execute Windows, Linux, Unix, or the like.

A queue used for an interfacing operation between the host device 100 and the storage device 200 may be loaded into the host memory 110. For example, a submission queue and a completion queue may be loaded into the host memory 110. In some example embodiments, one or more queues Q1 to Qn may be loaded into the host memory 110 and the one or more queues Q1 to Qn may comprise at least one of SQ the submission queue or the completion queue.

A submission queue may refer to a line in which various types of events, including a request of the host device 100 and a command CMD, are on standby to be processed. For example, the submission queue may store a command CMD issued by a corresponding core. The command CMD, stored in the submission queue, may be fetched by the host controller 120 to be transmitted to the storage device 200.

A completion queue may refer to a line in which various types of events, including a request of the storage device 200 and a response, are on standby to be processed. For example, the completion queue may store a response, completion information on an operation completed in the storage device 200, and the response stored in the completion queue may be fetched by the host controller 120 to indicate update of metadata to be processed in the host device 100 after a memory operation (for example, an operation of reading, writing, or erasing data) is completed.

For ease of description, hereinafter, example embodiments will be described with a focus on a submission queue, and it will be assumed that the submission queue is a circular queue. However, this is merely exemplary, and example embodiments are not limited thereto. For ease of description, hereinafter, a queue in which logical addresses LA of stored commands CMDs are sequential will be referred to as a sequential queue, and a queue in which logical addresses LA of stored commands CMDs are random will be referred to as a random queue. Referring to FIG. 1, a first queue Q1 may be the sequential queue and a nth queue Qn may be the random queue.

The host device 100 may support multiple queues. For example, the host device 100 may include a plurality of cores, and a dedicated queue may be assigned to each of the plurality of cores. A plurality of queues, corresponding respectively to the plurality of cores, may be loaded into the host memory 110. Accordingly, each of the plurality of cores may issue a command CMD to a dedicated queue thereof and may manage the issued command CMD without interference from other cores.

The host controller 120 may control the overall operation of the host device 100. The host controller 120 may be implemented as, for example, a processor, a special-purpose processor, or an application processor. In some example embodiments, the host controller 120 may be implemented as an operation processor (for example, a central processing unit (CPU), a graphics processing unit (GPU), an application processor (AP), or the like) including a special-purpose logic circuit (for example, a field programmable gate array (FPGA), application specific integrated circuits (ASICs), or the like).

The host controller 120 may execute various types of software loaded into the host memory 110. For example, the host controller 120 may execute an operating system (OS) and application programs.

The host controller 120 may include one or more cores. For example, a dedicated queue may be assigned to each core, and each core may write a command CMD in a dedicated queue thereof or may remove a command CMD from the dedicated queue.

The host controller may further include another intellectual property (IP) to control the host device 100 and/or the storage device 200. For example, the host controller 120 may further include an accelerator, a special-purpose circuit for a high-speed data operation such as an artificial intelligence (AI) data operation, and the accelerator may include a graphics processing unit (GPU), a neural processing unit (NPU), and/or a data processing unit (DPU). According to example embodiments, such an IP may write a command CMD in a queue or may remove a command CMD from a queue.

In some example embodiments, the host controller 120 may set information, required to significantly improve a parallel processing function of the storage device 200, and may transmit the information to the storage device 200 to effectively use the parallel processing function of the storage device 200. To this end, the host controller 120 may include a command (CMD) manager 130.

The command (CMD) manager 130 may set information on a queue ID for each command CMD. The information on a queue ID may be used such that the storage device 200 detects a command pattern of each queue. For example, the command manager 130 may set the same queue ID for commands CMD belonging to the same queue and may set different queue IDs for commands CMDs belonging to different queues. For example, the command manager 130 may set a queue ID for a predetermined field such as a group number field or a reserved field of a command CMD.

In some example embodiments, the command manager 130 may set a parallelism demand level for each queue. The parallelism demand level may be used such that, for example, the storage device 200 sets a priority for a parallel processing function between queues. For example, when it is advantageous that commands CMDs stored in a queue are processed after being distributed to nonvolatile memory devices NVM1 to NVMm, the command manager 130 may set a high parallelism demand level for the queue. The command manager 130 may set a parallelism demand level in a field such as a reserved field of a command CMD. The field may be predetermined. The same parallelism demand level may be set for commands CMDs belonging to the same queue.

Continuing to refer to FIG. 1, the storage device 200 may include a storage controller 210 and a plurality of nonvolatile memories 241 to 24m. The storage device 200 may receive a command CMD and/or data DATA from the host device 100. The storage device 200 may perform a read operation to read data DATA from the plurality of nonvolatile memories 241 to 24m in response to the received command CMD, or may perform a write operation to write data DATA in the plurality of nonvolatile memories 241 to 24m in response to the received command CMD.

The plurality of nonvolatile memories 241 to 24m may be connected the storage controller 210 in parallel through respective corresponding channels CH1 to CHm. Each of the nonvolatile memories 241 to 24m may be a storage medium storing data according to a request of the host device 100.

In an example embodiment, each of the plurality of nonvolatile memories 241 to 24m may be implemented using a flash memory. For example, each of the plurality of nonvolatile memories 241 to 24m may include a two-dimensional or three-dimensional memory cell array, and the memory cell array may include a plurality of memory cells.

In an example embodiment, each of the nonvolatile memories 241 to 24m may be implemented using another memory, other than a flash memory. For example, the plurality of the nonvolatile memories 241 to 24m may be implemented using a magnetic RAM (MRAM), a spin transfer torque MRAM (STT-MRAM), a conductive bridge RAM (CBRAM), a ferroelectric RAM (FeRAM), a phase-change RAM (PRAM), a resistive RAM (RRAM), or various types of memory.

In an example embodiment, the plurality of memories 241 to 24m may be implemented using homogenous memories or heterogeneous memories. In an example embodiment, each of the plurality of memories 241 to 24m may be implemented as independent memory chips, or may be a removable external memory.

The storage controller 210 may control the overall operation of the storage device 200. For example, the storage controller 210 may schedule operations of the plurality of nonvolatile memories 241 to 24m, and may control a read operation or a write operation of the plurality of nonvolatile memories 241 to 24m.

In an example embodiment, the storage controller 210 may control an order of processing a command CMD and/or data DATA based on the queue ID and/or the parallelism demand level received from the host device 100. To this end, the storage controller 210 may include a pattern analyzer 220 and an input/output (IO) scheduler 230.

The pattern analyzer 220 may sort commands CMDs based on the queue ID and may detect pattern information of each queue. For example, the pattern analyzer 220 may sequentially store commands CMDs corresponding to the same queue ID and, among the stored commands CMDs for a given queue, may detect whether logical addresses LA of the commands CMDs corresponding to the queue have a sequential pattern or a random pattern.

The IO scheduler 230 may receive pattern information of each queue from the pattern analyzer 220. The IO scheduler 230 may control the order of processing commands CMDs and/or data DATA based on the pattern information of each queue. For example, the IO scheduler 230 may control the order of processing commands CMDs and/or data DATA such that commands CMDs, corresponding to a queue having a sequential pattern, are preferentially processed in the plurality of nonvolatile memories 241 to 24m, as compared to commands CMDs, corresponding to a queue having another pattern such as a random pattern. For example, the IO scheduler 230 may control the processing of the commands CMDs and/or data DATA such that the commands CMDs, corresponding to the queue having the sequential pattern are given priority in processing and processed first by the plurality of nonvolatile memories 241 to 24m before the commands CMDs, corresponding to a queue having another pattern such as a random pattern. As another example, the IO scheduler 230 may control the processing of the commands CMDs and/or data DATA to ensure that the commands CMDs, corresponding to the queue having the sequential pattern are processed in parallel by the plurality of nonvolatile memories 241 to 24m, as compared to the commands CMDs, corresponding to a queue having another pattern such as a random pattern.

According to some example embodiments, the IO scheduler 230 may refer to a parallelism demand level of each queue. The IO scheduler 230 may control the order of processing commands CMDs and/or data DATA based on the pattern information and the parallelism demand level of each queue. For example, when queues having two or more sequential patterns are present, commands CMDs corresponding to a queue having a higher parallelism demand level may be preferentially processed in the nonvolatile memories 241 to 24m, as compared to a queue having a lower parallelism demand level. For example, when the queues having two or more sequential patterns are present, commands CMDs corresponding to the queue having the higher parallelism demand level may be prioritized and processed first in the nonvolatile memories 241 to 24m, as compared to a queue having a lower parallelism demand level. In some example embodiments, for example, when queues having two or more random patterns are present, commands CMDs corresponding to a queue having a higher parallelism demand level may be preferentially processed in the nonvolatile memories 241 to 24*m*, as compared to a queue having a lower parallelism demand level. For example, when queues having two or more random patterns are present, the commands CMDs corresponding to the queue having the higher parallelism demand level may be given priority and processed first in the nonvolatile memories 241 to 24*m* before the commands CMDs corresponding to the queue having the lower parallelism demand level. As another example, when queues having two or more random patterns are present, the commands CMDs corresponding to the queue having the higher parallelism demand level may be processed in parallel in the nonvolatile memories 241 to 24*m*, as compared to the commands CMDs corresponding to the queue having the lower parallelism demand level. As described above, the parallelism demand level may be used to set a priority for a parallel processing function between queues having a sequential pattern or a priority for a parallel processing function between queues having a random pattern.

As set forth above, the storage system 10 according to some example embodiments may effectively utilize a parallel processing function of the storage device 200, based on information on a queue ID and/or a parallelism demand level, even in an environment in which the host device 100 supports multiple queues.

In the case of a related art storage system, a storage device does not recognize a sequential pattern of a queue. Accordingly, commands belonging to a queue having a sequential pattern may not utilize all channels. In some cases, commands belonging to the queue having the sequential pattern may be intensively disposed in a specific channel. As a result, a parallel processing function of the storage device may not be effectively utilized, and an operation of processing commands may be ineffectively performed.

By contrast, in the storage system 10 according to some example embodiments, the host device 100 may set information for a queue ID and/or a parallelism demand level and the storage device 200 may control an order of processing commands based on a queue pattern and/or the parallelism demand level. Accordingly, the storage system 10 according to some example embodiments may effectively utilize the parallel processing function of the storage device in an environment in which the host device 100 supports multiple queues.

Figure 2:
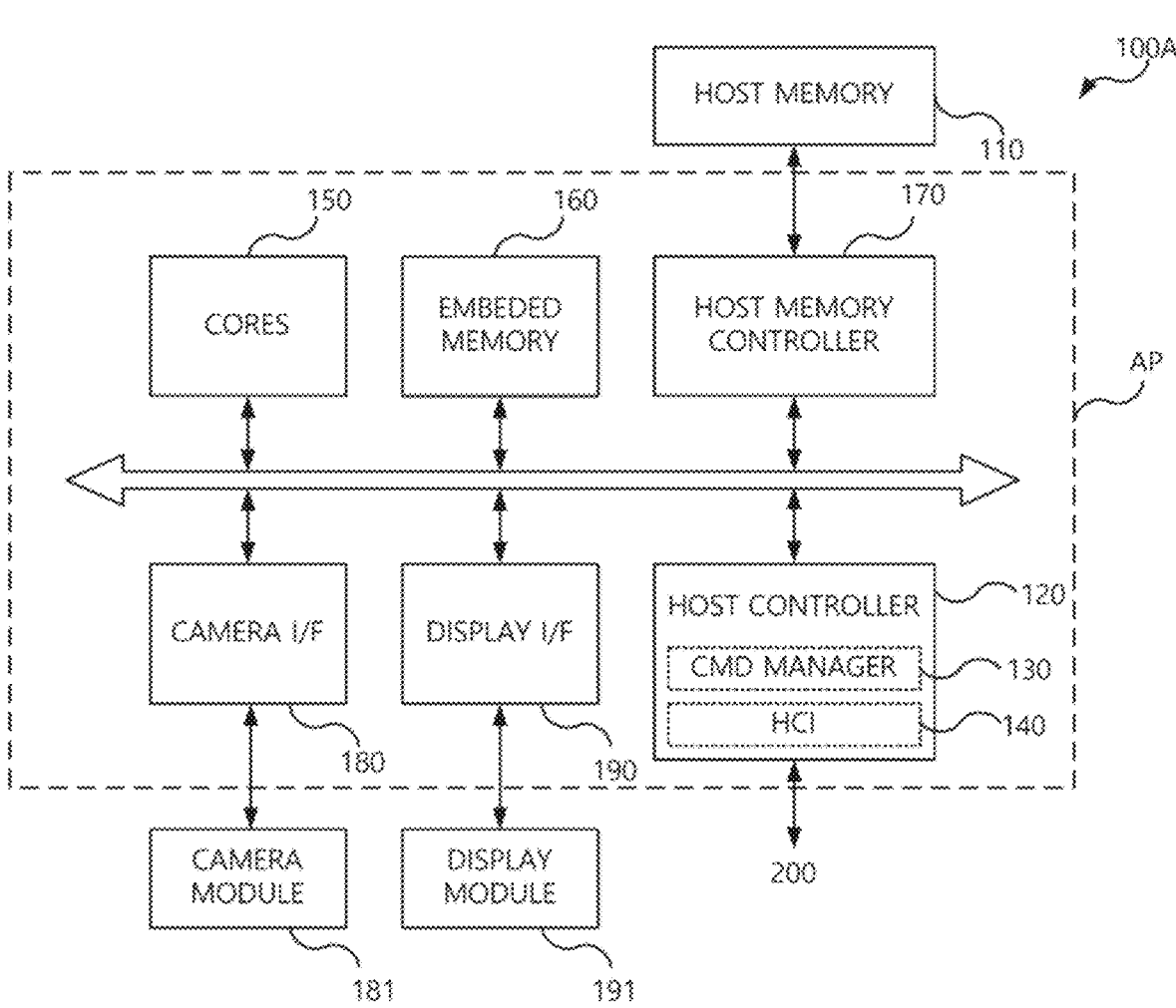
FIG. 2 is a block diagram illustrating a more detailed example of a host device of the storage system of FIG. 1, according to some example embodiments.

FIG. 2 is a block diagram illustrating a more detailed example of the host device of the storage system of FIG. 1, according to some example embodiments. In FIG. 2, for example, it will be assumed that a host device 100A is implemented as an electronic device such as a mobile device.

Referring to FIG. 2, the host device 100A may include an application processor AP, a host memory 110, a camera module 181, and a display module 191.

The application processor AP may be implemented to include one or more IPs. For example, the application processor AP may include a plurality of cores 150, an embedded memory 160, a host memory controller 170, a camera interface (I/F) 180, a display interface (I/F) 190, and a host controller 120, and the host controller 120 may include a command (CMD) manager 130 and a host controller interface (HCI) 140.

The plurality of cores 150 may be a homogeneous multicore processor or a heterogeneous multicore processor.

A dedicated queue may be assigned to each of the plurality of cores 150. Each of the plurality of cores 150 may write a command CMD in a dedicated queue, or may remove a command CMD from a dedicated queue. A queue may have a sequential pattern or a random pattern depending on continuity of logical addresses of commands CMDs.

The embedded memory 160 may be disposed inside the application processor AP. Various types of software, executed by the application processor AP, may be loaded into the embedded memory 160. According to example embodiments, the embedded memory 160 may be used as a host memory. For example, a queue assigned to each of the plurality of cores 160 may be loaded into the embedded memory 160. For example, a program or data to be processed in the host controller 120 may also be loaded into the embedded memory 160.

The host memory controller 170 may control the host memory 110. For example, the host memory 110 may be disposed outside the application processor AP, and the host memory controller 170 may control the host memory 110 outside the application processor AP. However, this configuration is merely exemplary, and example embodiments are not limited thereto. For example, the host memory 110 may be implemented inside the application processor AP as an embedded memory. In this case, the host memory controller 170 may be implemented to be integrated with the host controller 120.

The camera interface (I/F) 180 and the display interface may provide interfacing with the camera module 181 and interfacing with the display module 191, respectively.

The host controller 120 may provide interfacing with a command CMD to the storage device 200. The host controller 120 may include the command manager 130 and the host controller interface 140.

The command (CMD) manager 130 may set information required to utilize a parallel processing function of the storage device 200. In an example embodiment, the command manager 130 may set information on a queue ID for each command CMD. In some example embodiments, the command manager 130 may set a parallelism demand level for each queue. The queue ID and/or the parallelism demand level may be set in a field of a command. The field may be predetermined.

The host controller interface (HCI) 140 may provide interfacing between the host device 100 and the storage device 200. For example, the host controller interface 140 may convert a format or table of a command CMD, a logical address LA, data DATA, or the like, issued from the host device 100, to provide interfacing between the host device 100 and the storage device 200.

In an example embodiment, a protocol applied to the host controller interface 140 may be a universal flash storage (UFS). The UFS may adopt a command protocol and a small computer system interface (SCSI) architecture model, supporting multiple commands having command queuing features, to enable a multi-thread programming paradigm. However, this is merely exemplary, and example embodiments are not limited thereto.

As an example, a protocol applied to the host controller interface 140 may be an embedded multimedia card (eMMC). The eMMC may provide a simplified application interface design, a small package size, and low power consumption. As another example, a protocol applied to the host controller interface 140 may include universal serial bus (USB), small computer system interface (SCSI), peripheral component interconnect express (PCIe), advanced technology attachment (ATA), parallel ATA (PATA), serial ATA (SATA), or serial attached SCSI (SAS).

In FIG. 2, the command (CMD) manager 130 and the host controller interface (HCI) 140 are illustrated as being implemented to be separated from each other. However, this is merely exemplary, and the command manager 130 and the host controller interface 140 may be implemented to be integrated with each other.

Figure 3:
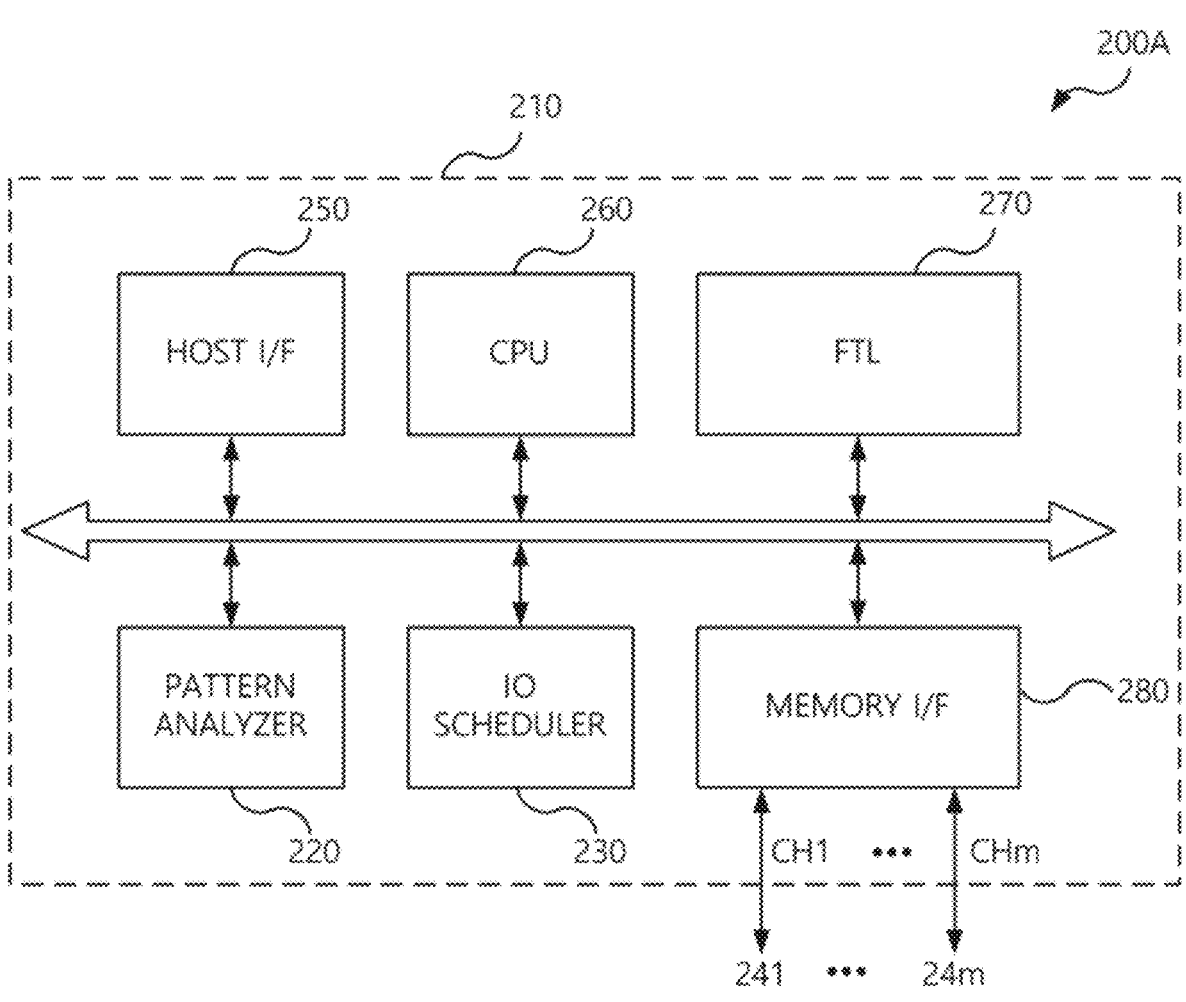
FIG. 3 is a block diagram illustrating a more detailed example of a storage device of the storage system of FIG. 1, according to some example embodiments.

FIG. 3 is a block diagram illustrating a more detailed example of a storage device of the storage system of FIG. 1, according to some example embodiments.

Referring to FIG. 3, a storage device 200A may include the storage controller 210 and the plurality of nonvolatile memories 241 to 24m, and the storage controller 210 may include a host interface (I/F) 250, a central processing unit (CPU) 260, a flash translation layer (FTL) 270, a memory interface (I/F) 280, a pattern analyzer 220, and an input/output (IO) scheduler 230.

The host interface (I/F) 250 may transmit and receive a command CMD and data DATA to and from the host device 100. In addition, information on a queue ID and information on a parallelism demand level may be included in a field of the command CMD received by the host interface 250 from the host device 100. The field may be predetermined.

The CPU 260 may control an overall read or write operation on the nonvolatile memories 241 to 24m.

The FTL 270 may perform an address mapping operation to translate logical addresses LA, received from the host device 100, into physical addresses PA of the nonvolatile memories 241 to 24m.

The memory interface (I/F) 280 may transmit and receive a command CMD and/or data DATA to and from the nonvolatile memories 241 to 24m. For example, during a read operation, the memory interface 280 may transmit a read command Read CMD to the nonvolatile memories 241 to 24m and may receive read data DATA from the nonvolatile memories 241 to 24m. For example, during a write operation, the memory interface 280 may transmit a write command Write CMD and data to be written DATA to the nonvolatile memories 241 to 24m.

The pattern analyzer 220 may receive a command CMD from the host device 100 through the host interface 250. The pattern analyzer 220 may sort commands CMDs by each queue according to an order, in which the commands CMDs are received, based on a queue ID of the command CMD.

The pattern analyzer 220 may detect pattern information of each queue based on logical addresses LA of commands CMDs corresponding to the queue. For example, the pattern analyzer 220 may identify whether the pattern information of each queue is a sequential pattern, capable of significantly improving an effect of the parallel processing function of the storage device 200. In some example embodiments, the pattern analyzer 220 may identify whether the pattern information of each queue indicates a sequential pattern, capable of significantly improving an effect of the parallel processing function of the storage device 200.

The input/output (IO) scheduler 230 may receive the pattern information of each queue from the pattern analyzer 220. The IO scheduler 230 may control an order of processing commands CMDs and/or data DATA based on the pattern information of each queue.

In an example embodiment, when a queue has a sequential pattern, the IO scheduler 230 may control an order of processing commands CMDs corresponding to the queue such that the commands CMDs are placed in parallel in the memories 241 to 24m.

For example, when commands CMDs having a sequential pattern are read commands, the IO scheduler 230 may sequentially distribute and place the read commands to the nonvolatile memories 241 to 24m. Accordingly, a plurality of pieces of data having logical continuity may be simultaneously read from the nonvolatile memories 241 to 24m. As a result, the plurality of pieces of data having the logical continuity may be rapidly read from the nonvolatile memories 241 to 24m.

For example, when commands CMDs having a sequential pattern are write commands, the IO scheduler 230 may sequentially distribute and place write commands and a plurality of pieces of write data, corresponding to the write commands, to the nonvolatile memories 241 to 24m. Accordingly, a plurality of pieces of write data having logical continuity may be simultaneously written in the nonvolatile memories 241 to 24m. As a result, a plurality of pieces of data having logical continuity may be rapidly written in the nonvolatile memories 241 to 24m.

According to some example embodiments, the IO scheduler 230 may receive a command through the host interface 250 and may identify a parallelism demand level set for the received command CMD. The IO scheduler 230 may control an order of processing commands CMDs and/or data DATA based on the parallelism demand level as well as the pattern information of each queue.

For example, when queues having two or more sequential patterns are present, the IO scheduler 230 may refer to a parallelism demand level of the queues. The IO scheduler 230 may preferentially place commands, corresponding to a queue having a higher parallelism demand level as compared to a queue having a lower parallelism demand level, in parallel in the nonvolatile memories 241 and 24m. Accordingly, a plurality of pieces of data may be rapidly read from the nonvolatile memories 241 to 24m or may be rapidly written in the nonvolatile memories 241 to 24m.

FIG. 4 is a flowchart illustrating an operation of a storage system of FIG. 1, according to some example embodiments.

In operation S10, a core may issue a command CMD to a queue. For example, each core of the host device 100 may issue a command CMD to a dedicated queue thereof.

In operation S20, the host device 100 may set a queue identifier (ID) for each command CMD. According to some example embodiments, the host device 100 may set a parallelism demand level for each queue. In this case, the host device 100 may set the same parallelism demand level for commands CMDs corresponding to a same queue.

In operation S30, the host device 100 may transmit the command CMD to the storage device 200. In this case, there may be a state in which information on a queue ID and/or the parallelism demand level is stored in a field of the command CMD. The field may be predetermined.

In operation S40, the storage device 200 may analyze pattern information of each queue based on the queue ID of the command CMD. For example, the storage device 200 may sort the commands CMDs based on the queue ID, and may analyze whether logical addresses LA of commands CMDs of each queue have a sequential pattern.

In operation S50, the storage device 200 may control an order of processing the commands CMDs based on pattern information and/or parallelism demand level. For example, the storage device 200 may control an order of processing the commands CMDs based on pattern information of each queue. For example, the storage device 200 may place commands CMDs, corresponding to a queue having a sequential pattern, in parallel in the plurality of nonvolatile memories 241 to 24*m* such that the commands CMDs are processed in parallel.

According to some example embodiments, the storage device 200 may control an order of processing the commands CMDs based on the pattern information and the parallelism demand level of each queue. For example, when two or more queues having a sequential pattern are present, the storage device 200 may preferentially place commands CMDs, corresponding to a queue having a higher parallelism demand level that a queue having a lower parallelism demand level, in parallel in the plurality of memories 241 to 24*m*.

In operation S60, the storage device 200 may process the commands CMDs in parallel in the plurality of memories 241 to 24*m*. For example, the storage device 200 may process the commands CMDs, placed in parallel in the plurality of memories 241 to 24*m*, in parallel. For example, when the commands CMDs are read commands, a plurality of pieces of data may be simultaneously read from the plurality of nonvolatile memories 241 to 24*m*. For example, when the commands CMDs are write commands, a plurality of pieces of write data may be simultaneously written in the plurality of nonvolatile memories 241 to 24*m*.

As set forth above in FIGS. 1 to 4, the storage system 10 according to some example embodiments may set information on a queue ID and/or a parallelism demand level, and the storage device 200 may control an order of processing commands based on a queue pattern and/or a parallelism demand level. Thus, the storage system 10 according to some example embodiments may effectively utilize a parallel processing function of the storage device 200 in an environment in which the host device 100 supports multiple queues.

Figure 5:
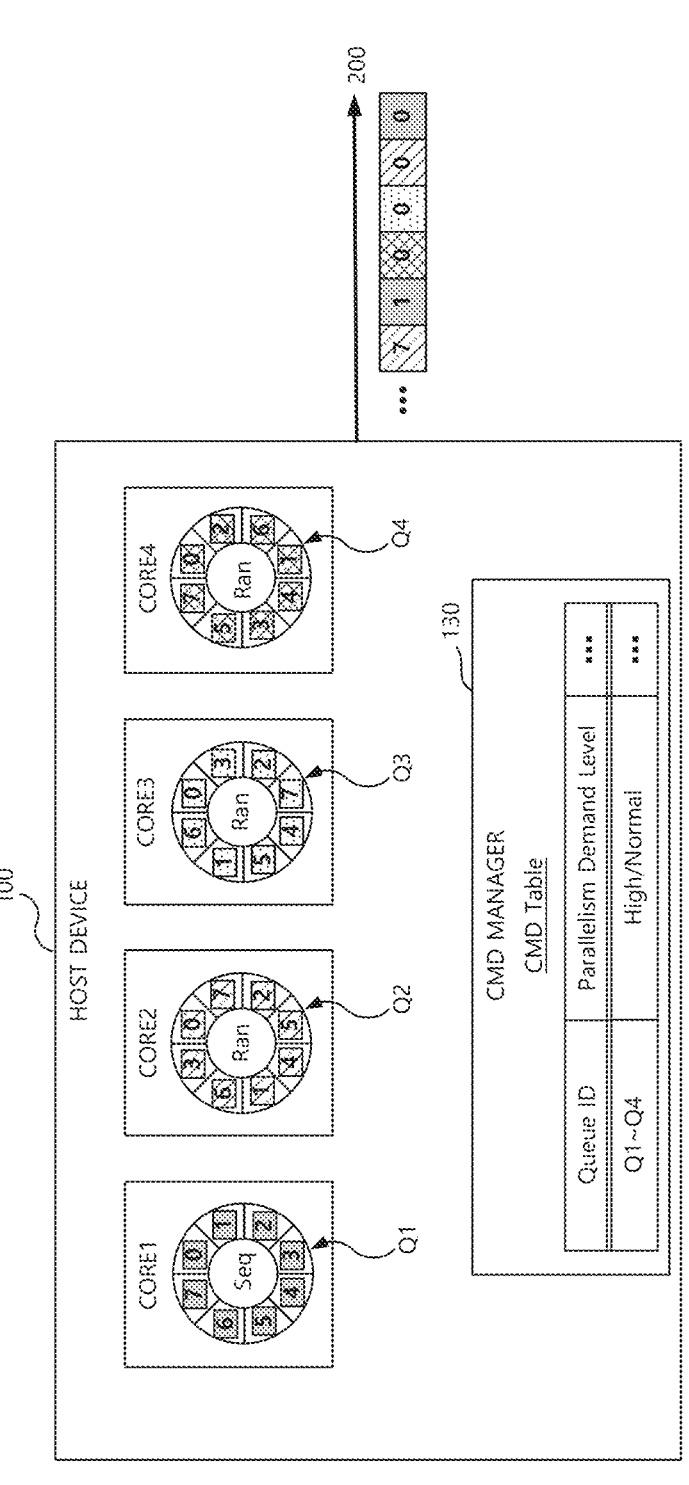
FIG. 5 is a diagram illustrating an example of an operation of a host device when a read operation is performed, according to some example embodiments.
Figure 8:
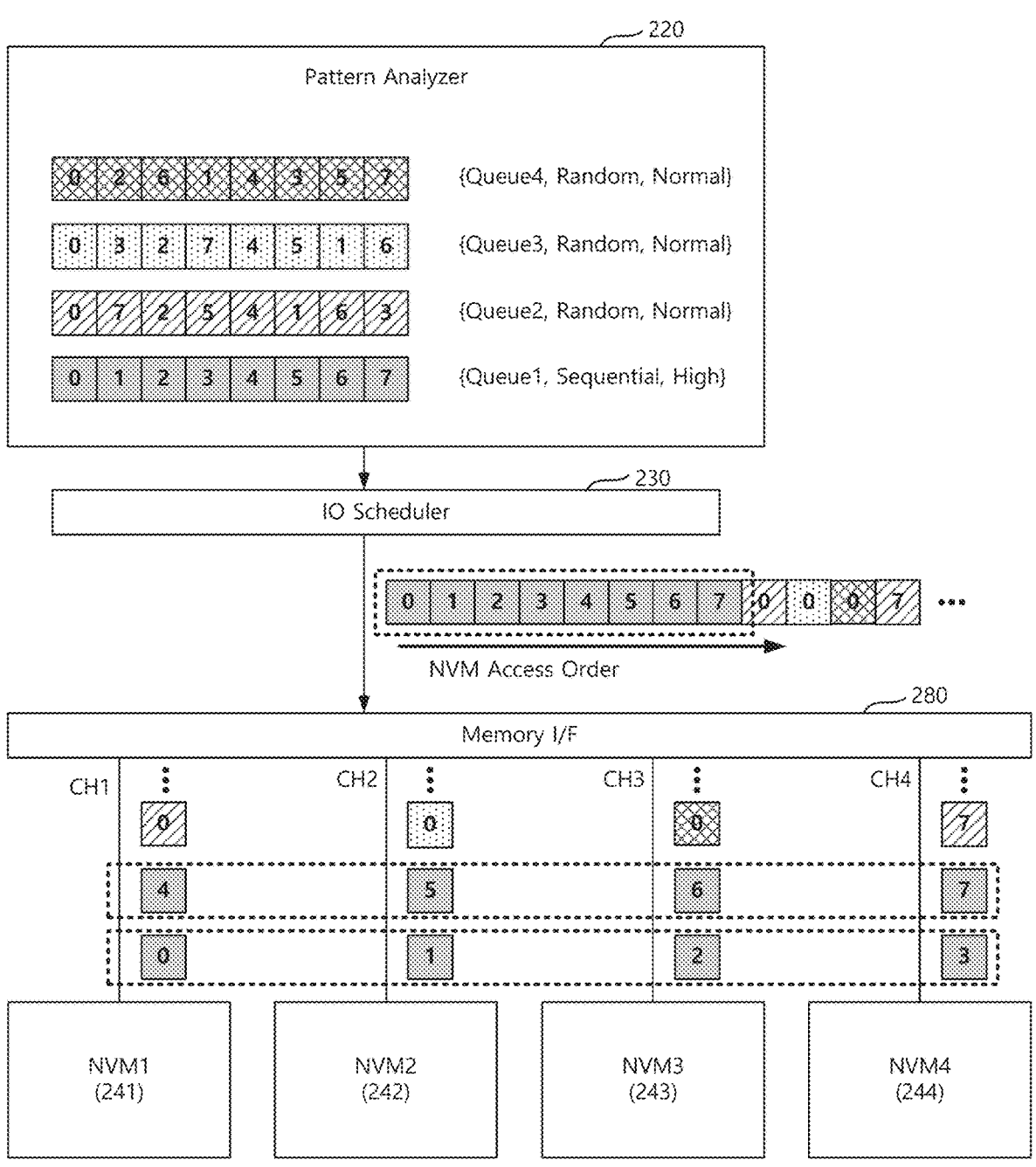
FIG. 8 is a diagram illustrating an example in which a parallel read operation is performed by a storage device, according to some example embodiments.

FIGS. 5 to 8 are diagram provided to describe an example of a read operation of the storage system of FIG. 1, according to some example embodiments. For example, FIG. 5 is a diagram illustrating an example of an operation of the host device 100 when a read operation is performed. FIG. 6 is a diagram illustrating an example in which a queue ID and a parallelism demand level are set by the host device 100. FIG. 7A is a diagram illustrating an example of a table of a read command. FIG. 7B is a diagram illustrating an example of a bit value of a field setting a queue ID. FIG. 7C is a diagram illustrating an example of a bit value of a field in which a parallelism demand level is set. FIG. 8 is a diagram illustrating an example in which a parallel read operation is performed by the storage device 200.

For ease of description, hereinafter, it will be assumed that the host device 100 includes four queues, including a first queue Q1, a second queue Q2, a third queue Q3, and a fourth queue Q4, and four cores, including a first core CORE1, a second core CORE2, a third core CORE3, and a fourth core CORE4, and the first to fourth queues Q1 to Q4 are dedicated queues of the first to fourth cores CORE1 to CORE4, respectively. In addition, it will be assumed that the first queue Q1 has a sequential pattern, and the second to fourth queues Q2 to Q4 have a random pattern. In addition, it will be assumed that a parallelism demand level is high or normal, a parallelism demand level of the first queue Q1 is high, and a parallelism demand level of the second to fourth queues Q2 to Q4 is normal. Here, the normal parallelism demand level is lower than the high parallelism demand level.

Referring to FIG. 5, the first core CORE1 of the host device 100 may issue read commands Read CMDs, having a sequential pattern, to a first queue Q1 of the first core CORE1. For example, the sequential pattern may be 0, 1, 2, 3, 4, 5, 6, 7. The second to fourth cores CORE2 to CORE4 may issue read commands, having a random pattern, to second to fourth queues Q2 to Q4, respectively. For example, the random pattern of the second queue Q2 may be 0, 7, 2, 5, 4, 1, 6, 3, the random pattern of the third queue Q3 may be 0, 3, 2, 7, 4, 5, 1, 6, and the random pattern of the fourth queue Q4 may be 0, 2, 6, 1, 4, 3, 5, 7.

The command (CMD) manager 130 may write information on a queue ID and a parallelism demand level in a command table CMD Table.

For example, a queue ID of read commands belonging to the first queue Q1 may be set to be 'Q1' and a parallelism demand level thereof may be set to be 'high,' as illustrated in FIG. 6. Queue IDs of read commands Read CMDs belonging to the second to fourth queues Q2 to Q4 may be set to be 'Q2,' 'Q3,' and 'Q4,' respectively and a parallelism demand level thereof may be set to be 'normal.'

As an example, a queue ID and a parallelism demand level may be set in a field of a read command table corresponding to a read command, as illustrated in FIG. 7A. The field may be predetermined. For example, the queue ID may be set in a group number field of the read command table. For example, the parallelism demand level may be set in a reserved field of the read command table. However, these locations are merely exemplary, and the queue ID and the parallelism demand level may be set in other fields.

As an example, among group number values for a read command, values from '10000b' to '11111b' may be set to be a queue ID, as illustrated in FIG. 7B. For example, in read command parameters of a Universal Flash Storage (UFS™) standard specification, among the group number values, reserved values may be set to be a queue ID. However, this is merely exemplary, and reserved values, other than the group number values, may be set to be a queue ID.

As an example, a 2-bit context configuration attributes value wContextConf ATTRIBUTES may be set to be a parallelism demand level, as illustrated in FIG. 7C. For example, in context configuration attributes of a Universal Flash Storage (UFS™) UFS standard specification, any two bits of Bit [15:8], a reserved value, may be set to be a parallelism demand level. However, this is merely exemplary and other reserved values, other than the context configuration attributes, may be set to be a queue ID.

In an example embodiment, the parallelism demand level may include high, normal, and no priority, as illustrated in FIG. 7C. However, this is merely exemplary, and the parallelism demand level may include only high and normal.

Referring to FIG. 8, the pattern analyzer 220 of the storage device 200 may sort, received read commands Read CMDs, by each queue based on a queue ID. For example, as illustrated in FIG. 8, the pattern analyzer 220 may sequentially sort the read commands Read CMDs, received from the host device 100, by each queue and may sequentially store the sorted read command Read CMDs.

The pattern analyzer 220 may detect a queue having a sequential pattern based on logical addresses LA of the read commands Read CMDs sorted by each queue. For example, logical addresses of read commands Read CMDs belonging to a first queue Q1 may sequentially increase from '0' to '7,' so that the pattern analyzer 220 may determine that the first queue Q1 has a sequential pattern. For example, logical addresses of read commands Read CMDs belonging to the second queue Q2 may not sequentially increase from '0' to '7,' so that the pattern analyzer 220 may determine that the second queue Q2 has a random pattern. In some example embodiments, the pattern analyzer 220 may detect a random sequence in the logical addresses LA of the read commands Read CMDs to determine whether the logical addresses LA have a random pattern.

The IO scheduler 230 may control an order of processing the read commands Read CMDs based on pattern information of each queue. For example, the IO scheduler 230 may control an order, in which the read commands Read CMDs access a nonvolatile memory, such that read commands Read CMDs of the first queue Q1 having a sequential pattern are placed in parallel in first to fourth channels CH1 to CH4.

Accordingly, read operations corresponding to zeroth to third read commands Read CMD0 to Read CMD3, among the read commands Read CMDs of the first queue Q1, may be simultaneously performed in the first to fourth nonvolatile memories 241 to 244. Then, read operations corresponding to fourth to seventh read commands Read CMD4 to Read CMD7, among the read commands Read CMDs of the first queue Q1, may be simultaneously performed in the first to fourth nonvolatile memories 241 to 244.

As set forth above, the storage system 10 according to some example embodiments may perform a read operation based on information on a queue ID and/or a parallelism demand level to effectively utilize a parallel processing function of the storage device 200 even in an environment in which the host device 100 supports multiple queues.

Figure 9:
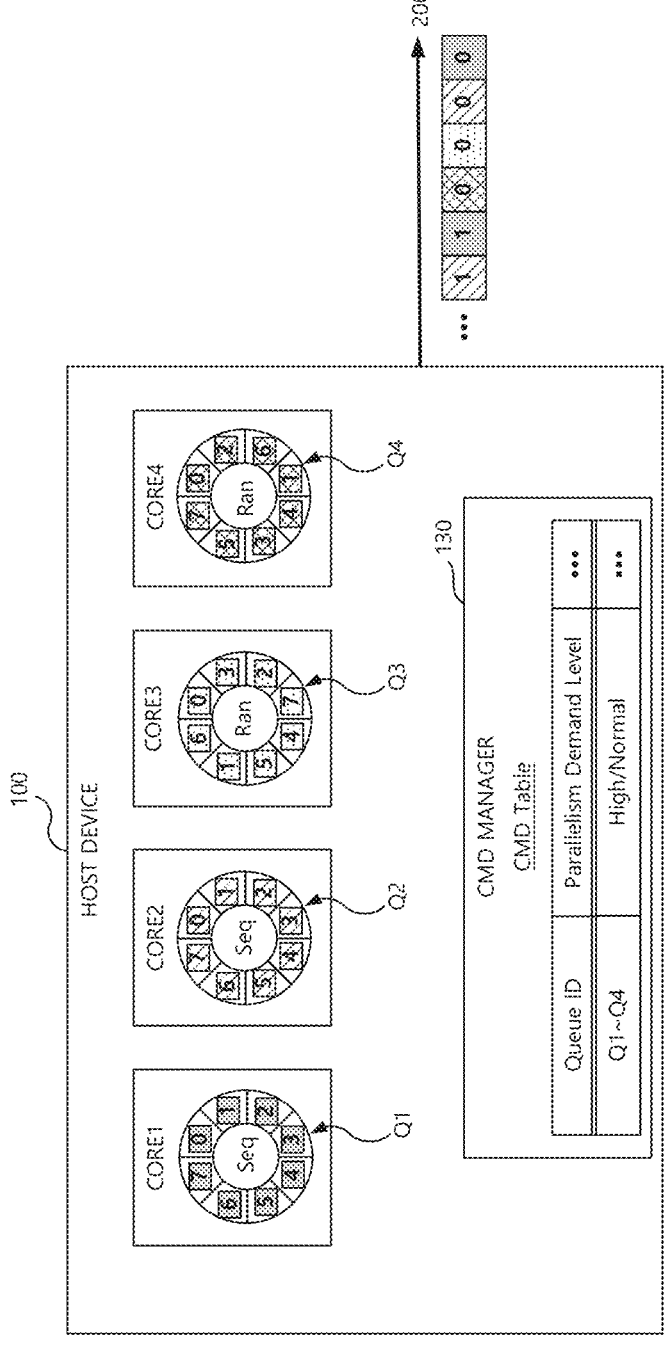
FIG. 9 is a diagram illustrating an example of an operation of the host device when a read operation is performed, according to some example embodiments.
Figure 11:
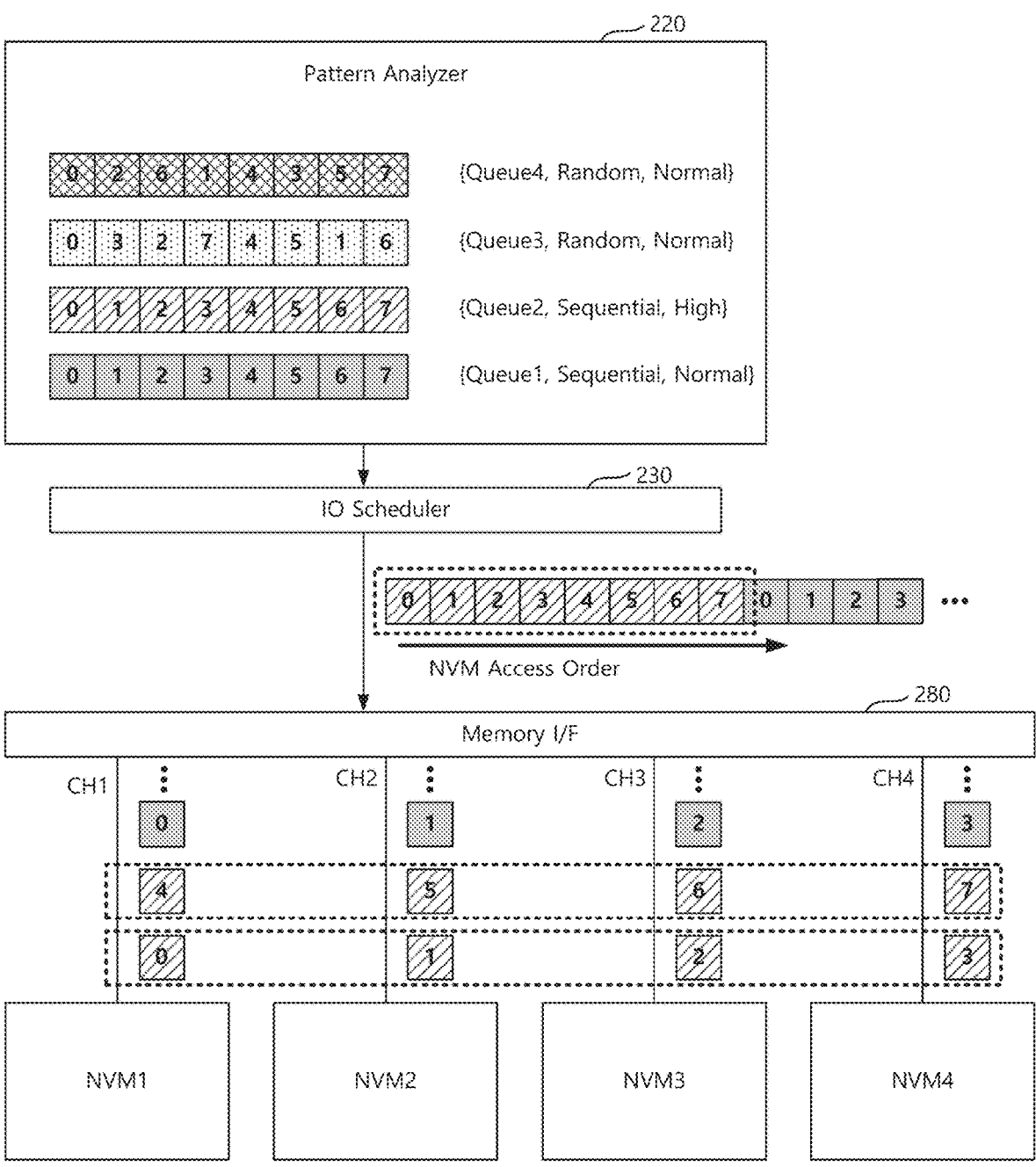
FIG. 11 illustrates an example in which a parallel read operation is performed by the storage device, according to some example embodiments.

FIGS. 9 to 11 are diagrams provided to describe another example of the read operation of the storage system 10 of FIG. 1, according to some example embodiments. For example, FIG. 9 is a diagram illustrating an example of an operation of the host device 100 when a read operation is performed. FIG. 10 is a diagram illustrating an example in which a queue ID and a parallelism demand level are set by the host device 100. FIG. 11 illustrates an example in which a parallel read operation is performed by the storage device 200.

A read operation of the storage system 10 of FIGS. 9 to 11 are similar to the read operation of the storage system 10 of FIGS. 5 to 8. Therefore, redundant descriptions will be omitted for brevity of description.

Unlike the read operation of FIGS. 5 to 8 under the assumption that only the first queue Q1 has a sequential pattern, in FIGS. 9 to 11, it will be assumed that a first queue Q1 and a second queue Q2 have a sequential pattern. In addition, it will be assumed that a parallelism demand level of the first queue Q1 is normal, and a parallelism demand level of the second queue Q2 is high.

Referring to FIG. 9, a first core CORE1 and a second core CORE2 of the host device 100 may issue read commands Read CMDs, having a sequential pattern, to a first queue Q1 and a second queue Q2 thereof, respectively. For example, the sequential pattern of each of the first queue Q2 and the second queue Q2 may be 0, 1, 2, 3, 4, 5, 6, 7. A third core CORE3 and a fourth core CORE4 of the host device 100 may issue read commands Read CMDs, having a random pattern, to a third queue Q3 and a fourth queue Q4 thereof, respectively. For example, the random pattern of the third queue Q3 may be 0, 3, 2, 7, 4, 5, 1, 6, and the random pattern of the fourth queue Q4 may be 0, 2, 6, 1, 4, 3, 5, 7.

The command (CMD) manager 130 may write information on a queue ID and a parallelism demand level in a read command table of each of the read command Read CMDs.

For example, a queue ID of read commands Read CMDs belonging to the first queue Q1 may be set to be 'Q1' and a parallelism demand level thereof may be set to be 'normal,' as illustrated in FIG. 10. A queue ID of read command Read CMDs belonging to the second queue Q2 are set to be 'Q2' and a parallelism demand level thereof may be set to be 'high.' Queue IDs of read commands Read CMDs belonging to the third and fourth queues Q3 and Q4 may be set to be 'Q3' and 'Q4,' respectively and parallelism demand levels thereof may be set to be 'normal.'

Referring to FIG. 11, the pattern analyzer 220 of the storage device 200 may sort, received read commands Read CMDs, by each queue based on a queue ID, and may detect queues having a sequential pattern. For example, logical addresses LA of the read commands Read CMDs belonging to the first and second queues Q1 and Q2 sequentially increase from '0' to '7,' so that the pattern analyzer 220 may determine that the first and second queues Q1 and Q2 have a sequential pattern. For example, logical addresses of read commands Read CMDs belonging to the third queue Q3 and the fourth queue Q4 may not sequentially increase from '0' to '7,' so that the pattern analyzer 220 may determine that the third queue Q3 and the fourth queue Q4 each has a random pattern. In some example embodiments, the pattern analyzer 220 may detect a random sequence in the logical addresses LA of the read commands Read CMDs to determine whether the logical addresses LA have a random pattern.

The IO scheduler 230 may control an order of processing read command Read CMDs based on pattern information of each queue. For example, the IO scheduler 230 may preferentially place queues having a sequential pattern in parallel in a first channel CH1 to a fourth channel CH4.

Since both the first and second queues Q1 and Q2 have a sequential pattern, the IO scheduler 230 may refer to a parallelism demand level. For example, as illustrated in FIG. 11, the IO scheduler 230 may identify that the parallelism demand levels of the first and second queues Q1 and Q2 are 'normal' and 'high', respectively. In this case, the IO scheduler 230 may control an order, in which read commands Read CMDs access a nonvolatile memory, such that the read commands Read CMDs of the second queue Q2 are preferentially placed in parallel in the first to fourth channels CH1 to CH4 first. The IO scheduler 230 may control an order, in which read commands Read CMDs access a nonvolatile memory, such that the read commands Read CMDs of the first queue Q1 are processed after the read commands Read CMDs of the second queue Q2 are processed.

Accordingly, read operations corresponding to zeroth to third read commands Read CMD0 to Read CMD3, among the read commands Read CMDs of the second queue Q2, may be simultaneously performed in the first to fourth nonvolatile memories 241 to 244. Then, read operations corresponding to fourth to seventh read commands Read CMD4 to Read CMD7, among the read commands Read CMDs of the second queue Q2, may be simultaneously performed in the first to fourth nonvolatile memories 241 to 244. Then, read operations corresponding to zeroth to third read commands Read CMD0 to Read CMD3, read commands Read CMDs of the first queue Q1, may be simultaneously performed in the first to fourth nonvolatile memories 241 to 244. In such a manner, an order of processing commands between queues having a sequential pattern may be determined.

FIG. 12 is a diagram illustrating an example of a method of setting a priority for a parallel processing function of the storage device 200, according to some example embodiments.

Referring to FIG. 12, a queue having a sequential pattern may have a higher priority for the parallel processing function of the storage device 200 than a queue having a random pattern.

In some example embodiments, between queues having a sequential pattern, a queue having a 'high' parallelism demand level may be a higher priority for the parallel processing function of the storage device 200 than a queue having a 'low' parallelism demand level.

In some example embodiments, even between queues having a random pattern, a queue having a 'high' parallelism demand level may have a higher priority for the parallel processing function of the storage device 200 than a queue having a 'low' parallelism demand level.

However, this is merely exemplary, and it is to be appreciated that a priority for the parallel processing function of the storage device 200 may be set in various manners.

According to some example embodiments, a priority for a parallel processing function between queues may be set in the same manner. For example, both parallelism demand levels of the first and second queues may be 'high.'

In this case, the storage device 200 may process commands of queues having the same priority in a round-robin manner. For example, the storage device 200 may process a portion of commands, among commands of a first queue, in parallel, may then process a portion of commands, among commands of a second queue, in parallel, may then process the remaining commands, among the commands of the first queue, in parallel, and may then process the remaining commands, among the commands of the second queue, in parallel. The portions of the commands may be predetermined. However, this is merely exemplary, and the storage device 200 may process commands of queues having the same priority in various manners.

Figure 13:
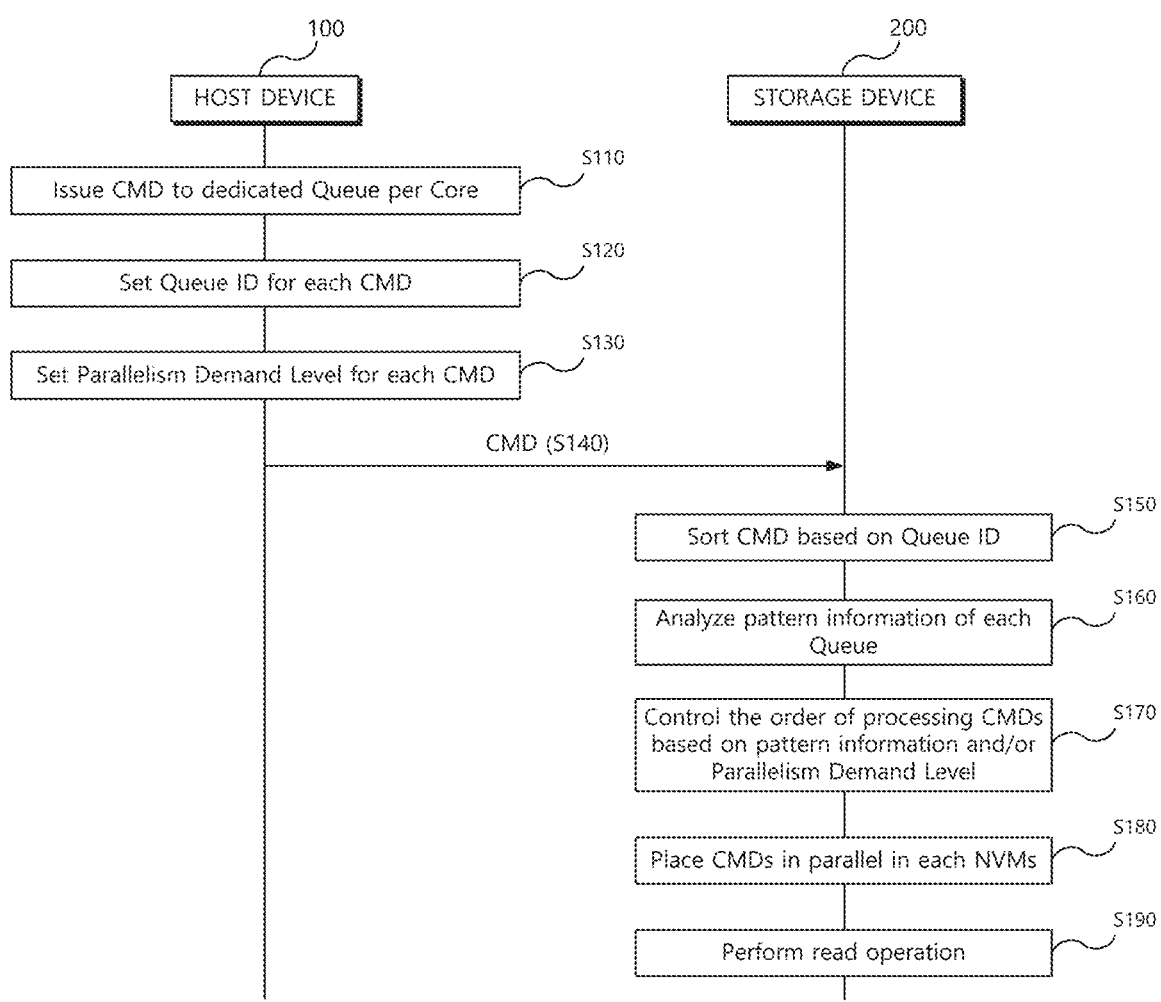
FIG. 13 is a flowchart illustrating a read operation of the storage system of FIG. 1, according to some example embodiments.

FIG. 13 is a flowchart illustrating a read operation of the storage system 10 of FIG. 1, according to some example embodiments.

In operation S110, each core of the host device 100 may issue a read command Read CMD to a dedicated queue thereof. According to continuity of the read commands Read CMDs, each queue may have either one of a sequential pattern and a random pattern.

In operation S120, the host device 100 may set a queue ID for each read command Read CMD. For example, the host device 100 may set a queue ID for a queue, to which each read command Read CMD belongs, in a group number field of the read command Read CMD. Accordingly, the same queue ID may be set for the read commands Read CMDs belonging to the same queue.

In operation S130, the host device 100 may set a parallelism demand level for each read command Read CMD. For example, the host device 100 may set a parallelism demand level for a queue, to which each corresponding read command Read CMD belongs, in a reserved field of the read command Read CMD. In this case, the same parallelism demand level may be set for a read command Read CMD belonging to the same queue.

In operation S140, a read command Read CMD may be transmitted from the host device 100 to the storage device 200. In this case, commands belonging to different queues may be mixed and transmitted, as illustrated in FIGS. 5 and 9.

In operation S150, the storage device 200 may sort the read command Read CMD based on the queue ID. For example, the storage device 200 may sort each read command Read CMD by a queue ID according to an order of receiving the read command Read CMDs from the host device 100, and may store the sorted read commands Read CMD for each queue.

In operation S160, the storage device 200 may analyze pattern information of each queue. For example, the storage device 200 may analyze whether each queue has a sequential pattern or a random pattern, based on logical addresses LA of the read commands Read CMDs of each queue.

In operation S170, an order processing the read commands Read CMDs may be controlled based on pattern information and/or parallelism demand level of each queue of the storage device 200.

For example, as described with reference to FIGS. 5 to 8, the storage device 200 may control the order of processing the read commands Read CMDs such that read operations on the read commands Read CMDs of a queue having a sequential pattern are preferentially processed in parallel.

In some example embodiments, for example, as described in FIGS. 9 to 12, when two or more queues having a sequential pattern are present, the storage device 200 may control the order of processing the read commands Read CMDs such that read operations on read commands Read CMDs of a queue having a higher parallelism demand level are preferentially processed in parallel that other queues.

In operation S180, the storage device 200 may place the read commands Read CMDs in parallel in a plurality of nonvolatile memories according to the order of processing the read commands read CMDs.

In operation S190, the storage device 200 may perform a read operation. In this case, as described in FIGS. 5 to 12, the read operations on the read commands Read CMDs, preferentially processed in parallel, may be performed in parallel in the plurality of nonvolatile memories.

As set forth above, the storage system 10 according to some example embodiments may control the order of processing read commands based on a queue pattern and/or a parallelism demand level. Accordingly, the parallel processing function of the storage device 200 may be effectively utilized during a read operation.

Figure 15:
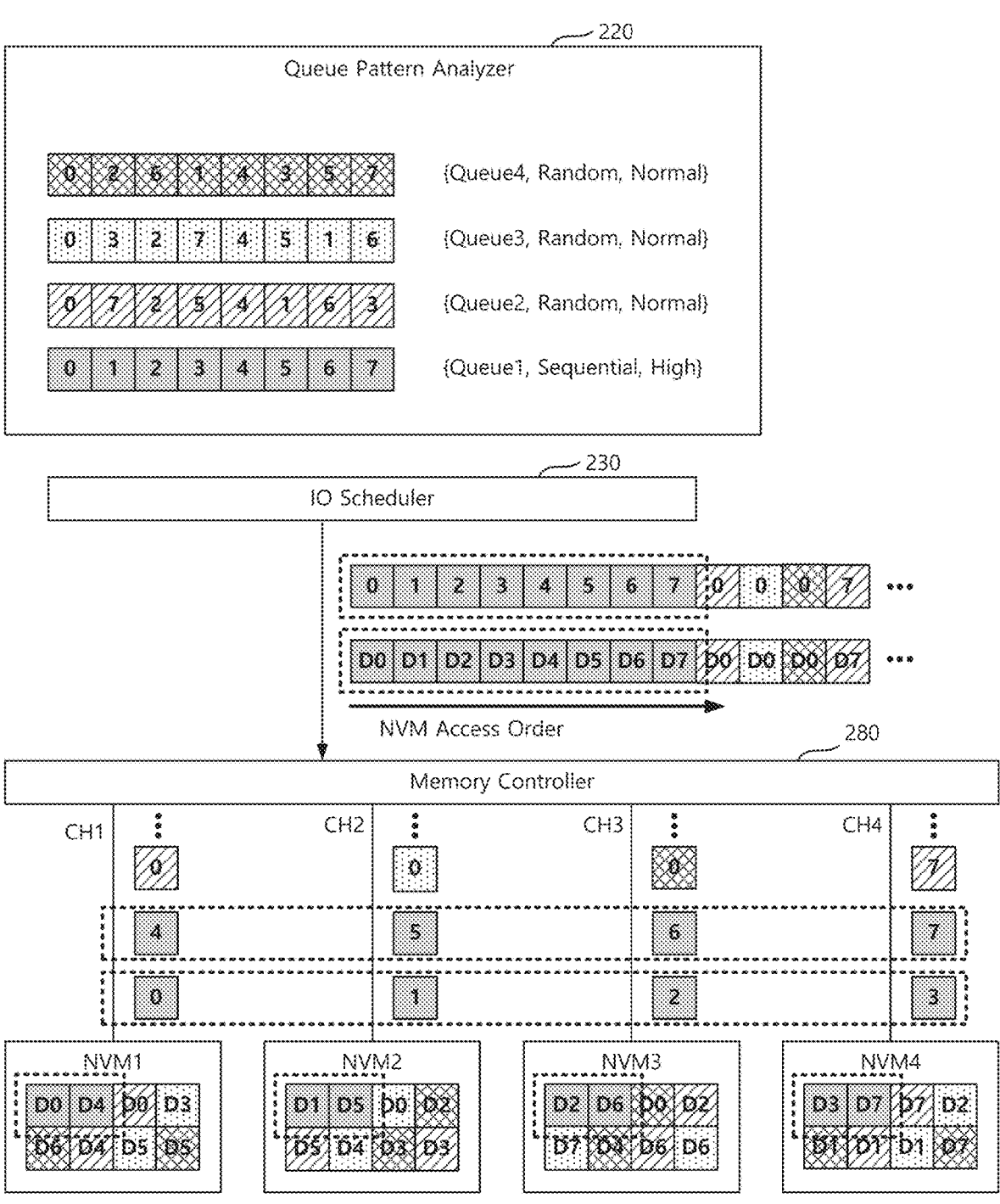
FIG. 15 is a diagram illustrating an example in which a parallel read operation is performed by the storage device, according to some example embodiments.

FIGS. 14 and 15 are diagrams provided to describe an example of a write operation of the storage system of FIG. 1, according to some embodiments. For example, FIG. 14 is a diagram illustrating an example of a table of a write command. FIG. 15 is a diagram illustrating an example in which a parallel read operation is performed by the storage device 200.

For ease of description, similarly to FIGS. 5 to 8, hereinafter, it will be assumed that a first queue Q1 has a sequential pattern and second to fourth queues Q2 to Q4 have a random pattern. In addition, it will be assumed that a parallelism demand level of the first queue Q1 is high and parallelism demand levels of the second to fourth queues Q2 to Q4 are normal. Except that write data is transmitted from the host device 100 to the storage device 200, the write operation of the storage system 10 of FIG. 1 is similar to a read operation of the storage system 10 described with reference to FIGS. 5 to 12. Therefore, redundant descriptions will be omitted below for brevity of description.

Referring back to FIG. 6, the host device 100 may write information on a queue ID and a parallelism demand level in a write command table Write CMD Table of each write command Write CMD. For example, a queue ID of write command Write CMDs belonging to a first queue Q1 may be set to be 'Q1,' and a parallelism demand level thereof may be set to be 'high.' Queue IDs of write commands Write CMDs belonging to the second to fourth queues Q2 to Q4 are set to be 'Q2,' 'Q3,' and 'Q4,' respectively and parallelism demand levels may be set to be 'normal.'

For example, a queue ID and a parallelism demand level may be set in a predetermined field of a write command table Write CMD Table corresponding to a write command Write CMD, as illustrated in FIG. 14. For example, the queue ID may be set in a group number field of the write command table Write CMD Table. For example, the parallelism demand level may be set in a reserved field of the write command table Write CMD Table. However, this is merely exemplary, and the queue ID and the parallelism demand level may be set in other fields.

Referring to FIG. 15, the pattern analyzer 220 of the storage device 200 may sort received write commands Write CMDs by each queue based on a queue ID. For example, as illustrated in FIG. 15, the pattern analyzer 220 may sequentially sort the write commands Write CMDs, received from the host device 100, by each queue and may sequentially store the sorted write commands Write CMDs.

The pattern analyzer 220 may detect a queue having a sequential pattern based on the write commands Write CMDs sorted by each queue. For example, logical addresses LA of write commands Write CMDs belonging to the first queue Q1 sequentially increase from '0' to '7,' so that the pattern analyzer 220 may determine that the first queue Q1 has a sequential pattern. For example, logical addresses of write commands Write CMDs belonging to the second queue Q2 may not sequentially increase from '0' to '7', so that the pattern analyzer 220 may determine that the second queue Q2 has a random pattern. In some example embodiments, the pattern analyzer 220 may detect a random sequence in the logical addresses LA of the write commands Write CMDs to determine whether the logical addresses LA have a random pattern.

The IO scheduler 230 may control an order of processing write commands Write CMDs based on pattern information of each queue. For example, the IO scheduler 230 may control an order, in which the write commands Write CMDs access a nonvolatile memory, such that the commands CMDs of the first queue Q1 having the sequential pattern are placed in parallel in first to fourth channels CH1 to CH4.

Accordingly, a plurality of pieces of write data D0 to D3 corresponding to zeroth to third write commands Write CMD0 to Write CMD3, among the write commands Write CMDS of the first queue Q1, may be simultaneously stored in the first to fourth nonvolatile memories 241 to 244, as illustrated in FIG. 15. Then, a plurality of pieces of write data D4 to D7 corresponding to fourth to seventh write commands Write CMD4 to Write CMD7, among the write commands Write CMDS of the first queue Q1, may be simultaneously stored in the first to fourth nonvolatile memories 241 to 244.

As set forth above, the storage system 10 according to some example embodiments may perform a write operation based on information on a queue ID and/or a parallelism demand level to effectively utilize a parallel processing function of the storage device 200 even in an environment in which the host device 100 supports multiple queues.

Figure 16:
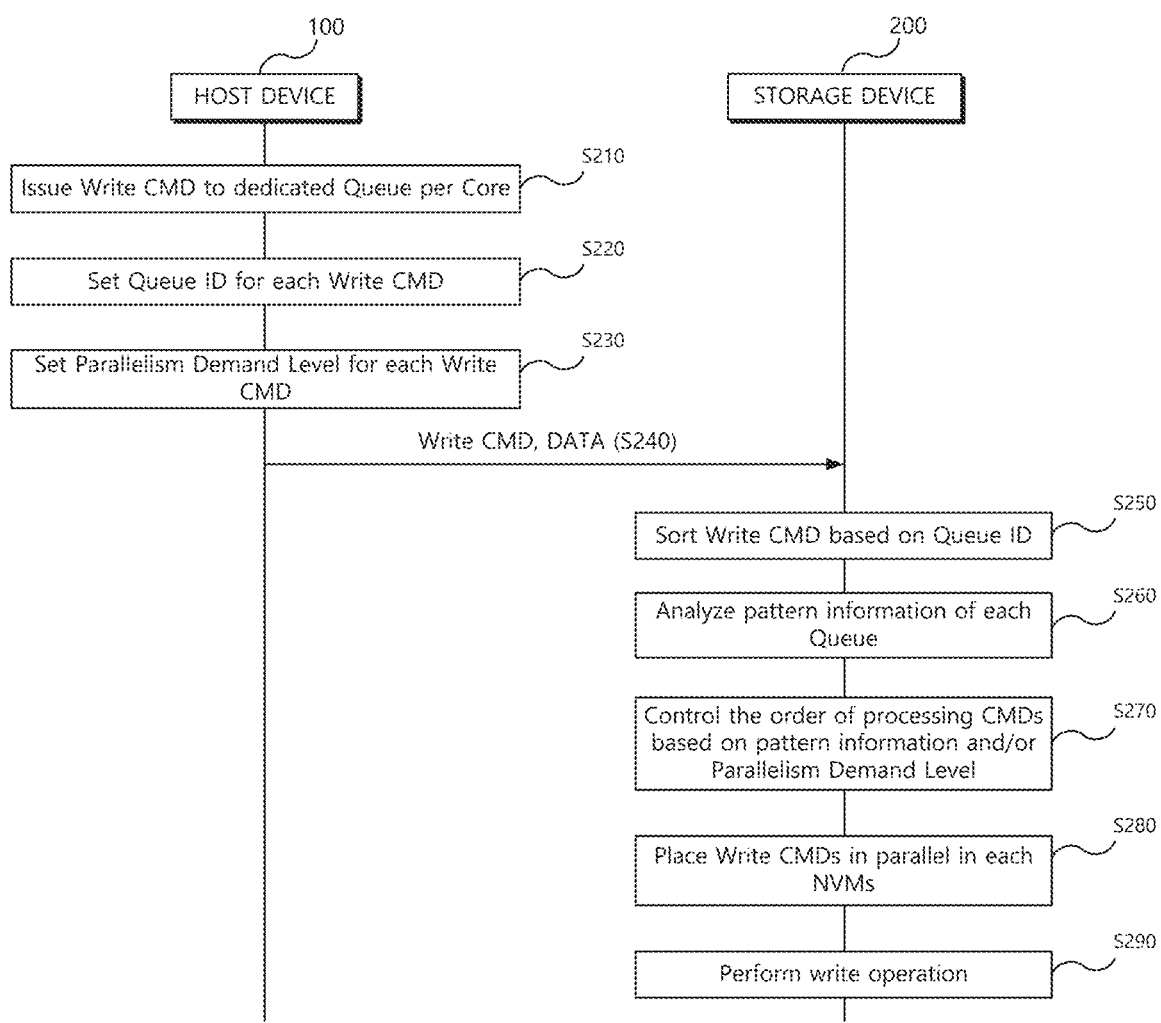
FIG. 16 is a flowchart illustrating a read operation of the storage system of FIG. 1, according to some example embodiments.

FIG. 16 is a flowchart illustrating a read operation of the storage system 10 of FIG. 1.

In operation S210, each core of the host device 100 may issue a write command Write CMD to a dedicated queue thereof. According to continuity of logical addresses LA of the write commands Write CMDs, each queue may have either one of a sequential pattern and a random pattern.

In operation S220, the host device 100 may set a queue ID for each write command Write CMD. For example, the host device 100 may set a Queue ID for each write command Write CMD. For example, the host device 100 may set a queue ID for a queue, to which each write command Write CMD belongs, in a group number field of the write command Write CMD.

In operation S230, the host device 100 may set a parallelism demand level for each write command Write CMD. For example, the host device 100 may set a parallelism demand level for a queue, to which each write command Write CMD belongs, in a reserved field of the write command Write CMD.

In operation S240, a write command Write CMD and data DATA may be transmitted from the host device 100 to the storage device 200. In this case, command belonging to different queues may be mixed and transmitted.

In operation S250, the storage device 200 may sort write commands Write CMDs based on a queue ID. For example, the storage device 200 may sort each command Write CMD by each queue ID according to an order of receiving write commands Write CMDs from the host device 100.

In operation S260, the storage device 200 may analyze pattern information of each queue. For example, the storage device 200 may analyze whether each queue has a sequential pattern or a random pattern, based on logical addresses LA of the write commands Write CMDs.

In operation S270, the storage device 200 may control an order of processing the write command Write CMDs based on pattern information and/or a parallelism demand level of each queue.

In operation S280, the storage device 200 may place the write commands Write CMDs in a plurality of nonvolatile memories according to the order of processing the write commands Write CMDs.

In operation S290, the storage device 200 may perform a write operation. In this case, write operations on write commands Write CMDs having a high priority for parallel processing may be preferentially processed in parallel.

As set forth above, the storage system 10 according to some example embodiments may control an order of processing write commands based on a queue pattern and/or a parallelism demand level. Accordingly, a parallel processing function of the storage device 200 may be effectively utilized during a write operation.

In FIGS. 5 to 16, it has been described that the storage device 200 processes all commands of a queue having a highest priority for parallel processing, and then processes commands of a queue having a next highest priority. However, this is merely exemplary and example embodiments are not limited thereto. For example, in some embodiments, the storage device 200 may limit the number of commands, which may be successively processed in a single queue, to a predetermine number. Accordingly, commands corresponding to a queue having a low priority for parallel processing may be prevented from being processed too late.

In FIGS. 5 to 16, it has been described that the host device 100 may set a queue ID and a parallelism demand level, and the storage device 200 controls an order of processing commands based on the queue ID and the parallelism demand level. However, this is merely exemplary and example embodiments are not limited thereto. For example, as will be described below, the host device 100 and the storage device 200 may operate based on only the queue ID according to some example embodiments.

FIG. 17 is a diagram illustrating an example of a table of a read command according to some example embodiments. The read command table of FIG. 17 is similar to that of FIG. 7A. Therefore, redundant descriptions will be omitted below.

Referring to FIG. 17, only a queue ID may be set in a read command table. For example, in read command parameters of a Universal Flash Storage (UFS™) standard specification, the host device 100 (see FIG. 1) may set reserved values, among group number values, to be a queue ID and may not set a parallelism demand level. In this case, the host device 100 set information on the queue ID and the storage device 200 (see FIG. 1) may perform read operations corresponding to commands in parallel based on a queue pattern.

FIG. 18 is a diagram illustrating an example of a table of a write command according to some example embodiments. The write command table of FIG. 18 is similar to that of FIG. 14. Therefore, redundant descriptions will be omitted below for conciseness.

Referring to FIG. 18, only a queue ID may be set in a write command table. For example, in write command parameters of a UFS standard specification, the host device 100 (see FIG. 1) may set reserved values, among group number values, to be a queue ID and may not set a parallelism demand level. In this case, the host device 100 may set information on the queue ID and the storage device 200 (see FIG. 1) may perform write operations corresponding to commands in parallel based on a queue pattern.

Figure 19:
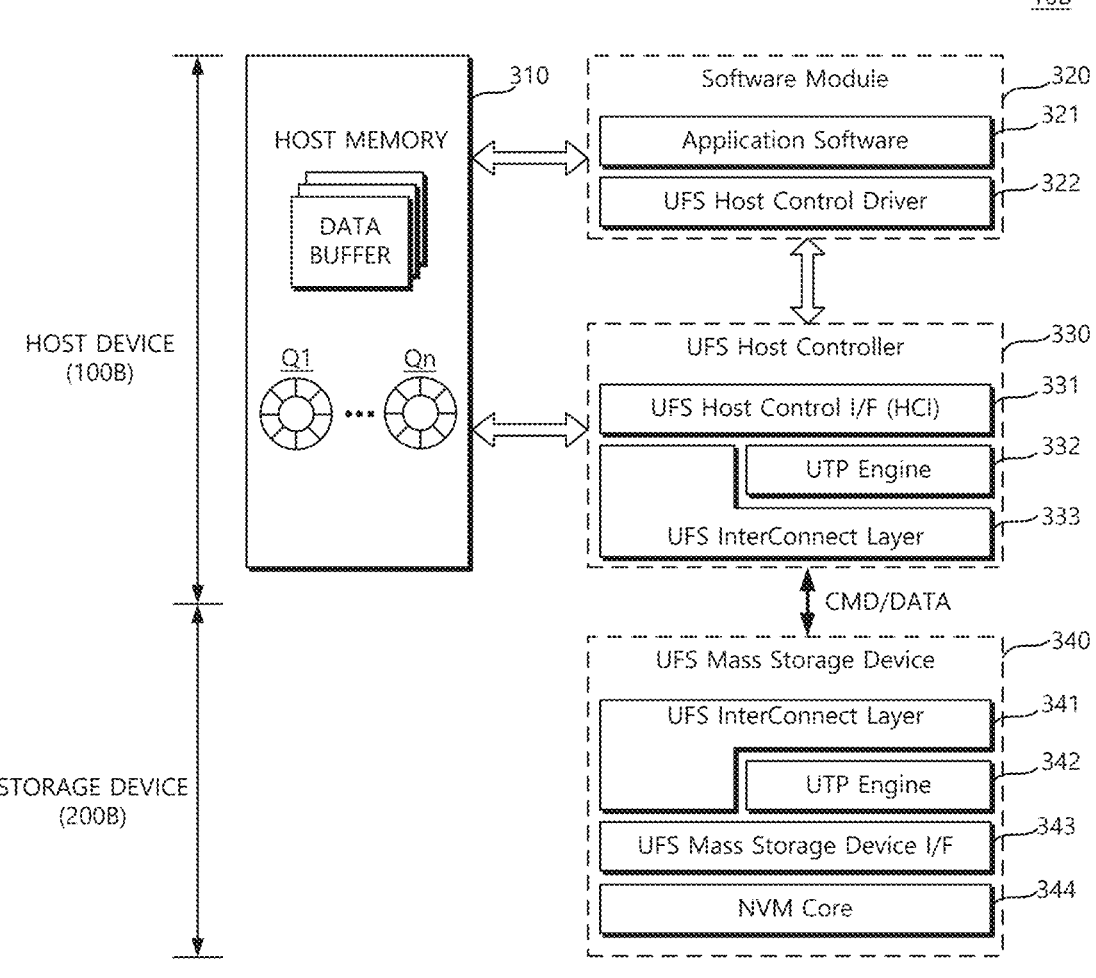
FIG. 19 is a block diagram illustrating another example of a configuration of the storage system of FIG. 1, according to some example embodiments.

FIG. 19 is a block diagram illustrating another example of a configuration of the storage system of FIG. 1, according to some example embodiments. A configuration of a storage system 10, to which a UFS interface is applied, is illustrated in FIG. 19.

Referring to FIGS. 1 and 19, a host device 100B and a storage device 200B of a storage system 10B may communicate with each other based on a UFS interface. The host device 100B may include a UFS host memory 310, a software module 320, and a UFS host controller 330 corresponding to a hardware module. The host memory 310 may provide a function, similar to that of the host memory 110 described in FIG. 1, and thus redundant descriptions will be omitted for conciseness.

The software module 320 may include application software 321 and a UFS host controller driver 322. The application software 321 may be various application programs executed in the UFS host device 100B, and the UFS host controller driver 322 may be provided to manage driving of peripheral devices connected to the host device 100B to be used. Data management operations, such as writing data in the storage device 200B and reading data from the storage device 200B, may be performed by executing the UFS host controller driver 322. The application software 321 and the UFS host controller driver 322 may be executed by being loaded into the host memory 310 or being loaded into another working memory inside the host device 100B.

The UFS host controller 330 may be an implementation example of the host controller 120 of FIG. 1. The UFS host controller 330 may include a UFS host controller interface (UFS HCI) 331, a UTP engine 332, and a UFS interconnect layer 333.

The UFS host controller interface 331 may receive a request generated through the UFS host controller driver 322, and may transmit the request to the UTP engine 332 or may provide a data access result, transmitted from the UTP engine 332, to the UFS host controller driver 322.

The UTP engine 332 may provide services for an upper layer (or an application layer). For example, the UTP engine 332 may set a queue ID or a parallelism demand level, similarly to the command (CMD) manager 130 of FIG. 1. However, this is merely exemplary, and the software module 320 may set the queue ID or the parallelism demand level, similarly to the command manager 130 of FIG. 1.

The UFS interconnect layer 333 may communicate with the UFS storage device 200B. As an example, the UFS interconnect layer 333 may include a link layer and a physical (PHY) layer. The link layer may be a Mobile Industry Processor Interface (MIPI) universal protocol (Uni-Pro), and the PHY layer may be a MIPI M-PHY. According to a UFS interface, the UFS host device 100B may provide a reference clock Ref Clock and a reset signal Rest to the UFS storage device 200B.

Continuing to refer to FIG. 19, the UFS storage device 200B may be implemented as the UFS mass storage device 340. The UFS storage device 200B may include the storage controller 210 and the plurality of nonvolatile memories 241 to 24m of FIG. 1.

According to some example embodiments, in FIG. 19, the UFS interconnect layer 341, the UTP engine 342, and the UFS mass storage device interface (I/F) 343 may correspond to the storage controller of FIG. 1. The memory core 344 may include a plurality of nonvolatile memories and may correspond to the plurality of nonvolatile memories 241 to 24m of FIG. 1.

In a structure in which the UFS host controller 330 and the UFS storage device 200B communicate with each other, transmission and reception of data according to a request from the UFS host controller driver 322 may be performed through the UFS host controller interface 331. As an example, during a write operation, write data may be stored in a data buffer of the host memory 310 by the software module 320, the UFS host controller interface 331 may access the data buffer of the host memory 310, and the accessed write data may be transmitted to the UFS storage device 200B. A command for the data transmission and reception operation may be stored in a queue. In an example embodiment, when a circular queue is used, a head pointer in which a command is stored and a tail pointer may be stored in the host memory 310.

In some example embodiments, the UFS host controller 330 and the UFS storage device 200B may be connected in a port-mapped input/output (I/O) form, and write and read operations may be processed in a multi-task method. Accordingly, the UFS storage device 200 may store and manage a plurality of commands and a plurality of buffer addresses corresponding to the plurality of commands.

Since the UFS interface is applied, various types of command tables may be defined and example embodiments may be applied to at least some of the various types of command tables.

In an example embodiment, a command table or a packet according to the UFS interface may be defined as a UFS protocol information unit (UPIU), and as a type thereof, a command table and packets, such as a command UPIU for write and read requests, a response UPIU, a Data_In UPIU including read data, a Data-Out UPIU including write data, a task management (TM) request UPIU, and a ready-to-transfer (RTT) UPIU, may be defined.

As set forth above, a UFS interface may be applied to the storage system according to some example embodiments. In this case, the host controller 120 of FIG. 1 may be implemented as the UFS host controller 330, and the storage controller 210 of FIG. 1 may be implemented through the UFS interconnect layer 341, the UTP engine 342, and the UFS massive storage device interface 343. Accordingly, a parallel processing function of the UFS storage device 200B may be effectively utilized in an environment in which the UFS host device 100B supports multiple queues.

Figure 20:
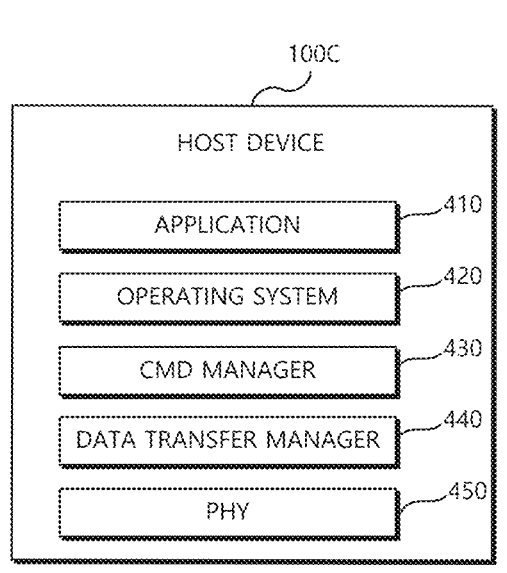
FIG. 20 is a block diagram illustrating another example of a configuration of the storage system of the memory device of FIG. 1, according to some example embodiments.
Figure 20:
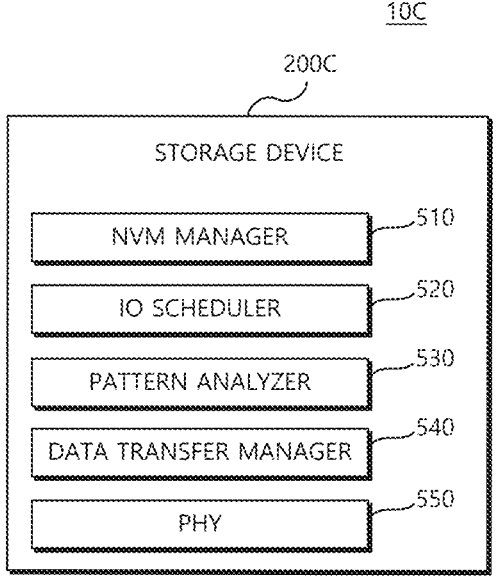

FIG. 20 is a block diagram illustrating another example of a configuration of the storage system of FIG. 1, according to some example embodiments.

Referring to FIG. 20, a storage system 10C may include a host device 100C and a storage device 200C.

The host device 100C may include an application 410, an operating system 420, a command (CMD) manager 430, a data transfer manager 440, and a physical layer (PHY) 450.

The physical layer (PHY) 450 may physically transmit and receive a command CMD and data DATA. The data transfer manager 440 may generate a packet including a command CMD and data DATA. The command manager 430 may generate various types of commands CMD which may be interpreted by the storage device 200C. The operating system 420 may include a file system. In an example embodiment, the command manager 430 may correspond to the command manager 130 of FIG. 1.

The storage device 200C may include a nonvolatile memory (NVM) manager 510, an input/output (IO) scheduler 520, a pattern analyzer 530, a data transfer manager 540, and a physical layer (PHY) 550.

The physical layer (PHY) 550 may physically transmit and receive a command CMD and data DATA. The data transfer manager 540 may manage a package including a command CMD and data DATA. The pattern analyzer 530 may analyze a pattern and a parallelism demand level of a queue corresponding to the command CMD transmitted by the host device 100C. The IO scheduler 520 may control an order in which commands CMD access nonvolatile memories. The NVM manager 510 may manage data stored in the nonvolatile memories. In an example embodiment, the pattern analyzer 530 may correspond to the pattern analyzer 220 of FIG. 1, and the IO scheduler 520 may correspond to the IO scheduler 230 of FIG. 1.

In the storage system 10C according to some example embodiments, information on a queue ID and/or a parallelism demand level may be set in the host device 100C, and the storage device 200C may control an order of processing commands based on a queue pattern and/or a parallelism demand level. Accordingly, a parallel processing function of the storage device 200C may be effectively utilized in an environment in which the host device 100C supports multiple queues.

As described above, a storage system according to example embodiments may effectively use a parallel processing function provided by a storage device.

While example embodiments have been shown and described above, it will be apparent to those skilled in the art that modifications and variations of the example embodiments may be made, all such modifications and variations being included within the scope of the appended claims.

What is claimed is:

1. A storage system comprising:
   a host device supporting multiple queues, the host device comprising:
      a first core;
      a first queue corresponding to the first core and configured to store a plurality of first commands;
      a second core;
      a second queue corresponding to the second core and configured to store a plurality of second commands; and
      a host controller configured to set a queue identifier (ID) for each the plurality of first commands stored in the first queue and each of the plurality of second commands stored in the second queue; and set a parallelism demand level for each of the plurality of first commands stored in the first queue and each of the plurality of second commands stored in the second queue, the parallelism demand level being set for each queue and indicating a priority for a parallel processing function between queues having a same pattern, and
   a storage device communicating with the host device, the storage device comprising:
      a plurality of nonvolatile memories; and
      a storage controller configured to detect pattern information of received commands that are received from the host device, based on the queue ID, and the parallelism demand level of the received commands, and to place the received commands in the plurality of nonvolatile memories based on both the pattern information and the parallelism demand level.

2. The storage system of claim 1, wherein:
   the host controller sets the queue ID in a group number field of each the plurality of first commands stored in the first core and each of the plurality of second commands stored in the second queue.

3. The storage system of claim 1, wherein:
   the host controller sets the parallelism demand level in a reserved area of each the plurality of first commands stored in the first queue and each of the plurality of second commands stored in the second queue.

4. The storage system of claim 3, wherein:
   the host controller sets the parallelism demand level using a 2-bit context configuration attributes value.

5. The storage system of claim 1, wherein:
   the storage controller sorts the received commands by queue based on the queue ID according to an order of receiving the received commands and detects the pattern information by queue based on a continuity of logical addresses of the received commands that have been sorted.

6. The storage system of claim 5, wherein the storage device further comprises:
   an input/output scheduler configured to receive the pattern information on each of the first queue and the second queue and to control an order of processing the received commands based on the pattern information, and
   wherein the input/output scheduler preferentially distributes and places the plurality of first commands corresponding to the first queue in the plurality of nonvolatile memories when the plurality of first commands corresponding to the first queue have a sequential pattern and the plurality of second commands corresponding to the second queue have a random pattern.

7. The storage system of claim 6, wherein:
   the plurality of first commands corresponding to the first queue are read commands, and read operations corresponding to the read commands are simultaneously performed in the plurality of nonvolatile memories.

8. The storage system of claim 6, wherein:
   the plurality of first commands corresponding to the first queue are write commands, and a plurality of pieces of write data, corresponding to the write commands, are simultaneously written in the plurality of nonvolatile memories.

9. The storage system of claim 6, wherein:
   the input/output scheduler controls the order of processing the received commands based on the parallelism demand levels of the first queue and the second queue when the plurality of first commands, corresponding to the first queue, have the sequential pattern and the plurality of second commands, corresponding to the second queue, have the sequential pattern.

10. The storage system of claim 1, wherein:

the host device transmits a packet in which a command is included, based on a flash storage interface, and the storage device receives the packet, based on the flash storage interface.

11. A host device communicating with a storage device, the host device comprising:

a host memory configured to store multiple queues; and a host controller configured to set a queue identifier (ID) and a parallelism demand level for commands, respectively corresponding to the multiple queues, the parallelism demand level being set for each queue and indicating a priority for a parallel processing function between queues having a same pattern, wherein the host controller sets the queue ID in a group number field of each of the commands and sets the parallelism demand level in a reserved area of each of the commands.

12. The host device of claim 11, wherein the host controller sets the parallelism demand level using a 2-bit context configuration attributes value.

13. The host device of claim 11, wherein the group number field is a 5-bit group number field area, and wherein the host controller sets the queue ID in a reserved area of the 5-bit group number field area, other than an area in which context IDs are set, in the 5-bit group number field area.

14. The host device of claim 11, wherein the host controller comprises:

a flash storage host controller interface configured to receive commands corresponding to each of the multiple queues;

a flash storage transport protocol engine configured to set the queue ID in the group number field of each of the received commands and to set the parallelism demand level in the reserved area of each of the received commands; and a flash storage interconnect layer configured to communicate with the storage device.

15. A storage device communicating with a host device, the storage device comprising:

a pattern analyzer configured to sequentially receive a plurality of commands from the host device and to analyze pattern information of the plurality of commands by queue based on a queue identifier (ID) of each of the plurality of commands;

an input/output scheduler configured to control an order of processing the plurality of commands based on both the pattern information received from the host device and a parallelism demand level received from the host device, the parallelism demand level being set for each queue and indicating a priority for a parallel processing function between queues having a same pattern; and a plurality of nonvolatile memories configured to perform read or write operations in parallel based on the order of processing the plurality of commands determined by the input/output scheduler.

16. The storage device of claim 15, wherein the queue ID is set in a group number field of each of the plurality of commands, and wherein the pattern analyzer sorts the plurality of commands based on the queue ID set in the group number field of each of the plurality of commands.

17. The storage device of claim 15, wherein the input/output scheduler preferentially places commands of the plurality of commands that correspond to a queue, in parallel in the plurality of nonvolatile memories when the pattern information is a sequential pattern.

18. The storage device of claim 15, wherein the input/output scheduler places the plurality of commands in parallel in the plurality of nonvolatile memories based on the parallelism demand level of a first queue and a parallelism demand level of a second queue when pattern information of commands of the plurality of commands that correspond to the first queue is a sequential pattern and pattern information of commands of the plurality of commands that correspond to the second queue is the sequential pattern.

19. The storage device of claim 18, wherein a command parallelism demand level is set in a reserved area of each of the plurality of commands, and wherein the input/output scheduler identifies the command parallelism demand level that is set in the reserved area of each of the plurality of commands.

20. The storage device of claim 18, wherein the parallelism demand level of the first queue is set using a 2-bit context configuration attributes value, and the parallelism demand level of the second queue is set using a 2-bit context configuration attributes value.

* * * * *